(12) United States Patent
Nakashima

(10) Patent No.: US 8,547,204 B2
(45) Date of Patent: Oct. 1, 2013

(54) INFORMATION PROCESSING APPARATUS, POWER-SUPPLY CONTROL METHOD, PROGRAM, AND POWER SUPPLY CONTROL SYSTEM

(75) Inventor: Ryoichi Nakashima, Tokyo (JP)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 12/911,980

(22) Filed: Oct. 26, 2010

(65) Prior Publication Data

US 2011/0102136 A1 May 5, 2011

(30) Foreign Application Priority Data

Nov. 2, 2009 (JP) ................................ 2009-252209

(51) Int. Cl.
*G06F 7/00* (2006.01)
(52) U.S. Cl.
USPC ............................................ 340/5.8; 307/80
(58) Field of Classification Search
USPC ............. 340/5.8, 5.1, 1.1, 426.1, 5.2; 307/80
See application file for complete search history.

(56) References Cited

U.S. PATENT DOCUMENTS

| | | | |
|---|---|---|---|
| 5,420,496 A | 5/1995 | Ishikawa | |
| 5,838,793 A * | 11/1998 | Lewis | 340/5.65 |
| 5,909,591 A * | 6/1999 | Brooke | 710/9 |
| 5,950,207 A * | 9/1999 | Mortimore et al. | 1/1 |
| 6,212,410 B1 * | 4/2001 | Ishida | 455/572 |
| 7,075,270 B1 | 7/2006 | Blum | |
| 7,120,507 B2 * | 10/2006 | Tanaka | 700/20 |
| 7,402,979 B1 | 7/2008 | Blum | |
| 7,602,979 B2 | 10/2009 | Yamaguchi | |
| 8,150,539 B2 | 4/2012 | Numano | |
| 2004/0074966 A1 * | 4/2004 | Holzer | 235/385 |
| 2006/0129415 A1 * | 6/2006 | Thukral et al. | 705/1 |
| 2007/0005197 A1 * | 1/2007 | Ito et al. | 701/1 |
| 2007/0145945 A1 * | 6/2007 | McGinley et al. | 320/114 |
| 2009/0256717 A1 * | 10/2009 | Iwai | 340/825 |
| 2010/0141425 A1 * | 6/2010 | Tracey et al. | 340/539.1 |
| 2011/0107120 A1 | 5/2011 | Nakashima | |

FOREIGN PATENT DOCUMENTS

| | | |
|---|---|---|
| JP | 11-275768 A | 10/1999 |
| JP | 2007-109465 A | 4/2007 |

OTHER PUBLICATIONS

U.S. Appl. No. 12/912,060, filed Oct. 26, 2010, Nakashima.

* cited by examiner

*Primary Examiner* — Brian Zimmerman
*Assistant Examiner* — Kevin Lau
(74) *Attorney, Agent, or Firm* — Wolf, Greenfield & Sacks, P.C.

(57) ABSTRACT

An information processing apparatus includes: a first connection section to which a first power-supply device is connected; a second connection section to which a second power-supply device is connected; a setting determiner that determines whether or not identification information is to be set for each power-supply device on the basis of connection states and setting control information; an authenticator that selectively obtains, when the setting determiner determines that identification information is not to be set, identification information from the power-supply devices connected to each connection section and that authenticates the obtained identification information; an identification-information setter that causes, when the setting determiner determines that identification information is to be set, unique identification information to be set for each power-supply device; and a processor that selectively performs executable power-supply-related processing on the basis of a result of the authentication or the identification-information setting and of processing control information.

8 Claims, 11 Drawing Sheets

FIG. 2

| CAMERA UNIQUE ID | AC ADAPTER UNIQUE ID | SECONDARY-BATTERY UNIQUE ID | POWER FEED (USING SECONDARY BATTERY) | POWER FEED (USING AC ADAPTER) | CHARGING (IN-CAMERA CHARGING) |
|---|---|---|---|---|---|
| × | × | × | ○ | ○ | ○ |
| ○ | × | × | × | × | × |
| × | ○ | × | ○ | × | × |
| × | × | ○ | × | ○ | × |
| ○ | ○ | × | × | ○ | × |
| ○ | × | ○ | ○ | × | × |
| × | ○ | ○ | × | × | × |
| ○ | ○ | ○ | ○ | ○ | ○ |

(E indicates row 6; F indicates row 8)

INFORMATION PROCESSING APPARATUS, POWER-SUPPLY CONTROL METHOD, PROGRAM, AND POWER SUPPLY CONTROL SYSTEM

BACKGROUND OF THE INVENTION

1. Field of the Invention

The present invention relates to an information processing apparatus, a power-supply control method, a program, and a power-supply control system.

2. Description of the Related Art

In recent years, for example, information processing apparatuses to which a power-supply device (e.g., a battery) having power-feeding and charging capabilities and a power-supply device (e.g., an AC (alternating current) adapters) having a power-feeding capability are connectable have been widely used. Typical examples of such information processing apparatuses are notebook PCs (personal computers) and digital cameras. For example, when both a battery and an AC adapter are connected to such an information processing apparatus, it can receive power fed from both of the battery and the AC adapter and also can charge the battery with the power fed from the AC adapter.

Under such a situation, technologies for controlling power supply on the basis of identification information of power-supply devices connected to an information processing apparatus have been developed. For example, Japanese Unexamined Patent Application Publication No. 2007-109465 discloses a technology in which a determination as to genuine-cell information included in a battery device and a determination as to whether or not the battery device satisfies any of predetermined conditions are made and user of the battery device is prohibited in accordance with a result of the determinations.

SUMMARY OF THE INVENTION

An information processing apparatus employing such a related technology that controls power supply on the basis of the identification information of a power-supply device connected to the information processing apparatus (such an information processing apparatus employing the related art may hereinafter be referred to as an "information processing apparatus of the related art") prohibits, when a battery device (corresponding to the power-supply device) does not satisfy any of the predetermined conditions, use of the battery device even if it has genuine-cell information (corresponding to the identification information). Thus, even if a modified battery device is connected to the information processing apparatus of the related art, the use of the related technology makes it possible to virtually deactivate the modified battery device. Accordingly, the related technology has a possibility of permitting use of only authorized battery devices.

However, the related technology merely selectively activates the power-supply device on the basis of the determination as to the identification information of the power-supply device and the determination as to whether or not any of the predetermined conditions is satisfied. Thus, with the related technology, when the power-supply device connected to the information processing apparatus of the related art has the genuine-cell information (corresponding to the identification information) and satisfies any of the predetermined conditions, use of the power-supply device is permitted even if the power-supply device is one stolen by a malicious third parity. In addition, with the related technology, for example, even if a malicious third party steals the information processing apparatus of the related art and connects an unmodified, authorized power-supply device of the party thereto, use of the power-supply device is permitted.

Thus, even when the related technology is used, it is difficult to restrict use of an unauthorized power-supply device and an unauthorized information processing apparatus that are fraudulently obtained (e.g., stolen) by a third party. It is, therefore, desirable to inhibit fraudulent obtainment (e.g., stealing) of a power-supply device and an information processing apparatus.

In view of the foregoing situation, it is desirable to provide a novel, improved information processing apparatus, power-supply control method, program, and power-supply control system which restrict use of an unauthorized power-supply device and an unauthorized information processing apparatus to make it possible to inhibit fraudulent obtainment of a power-supply device and an information processing apparatus by a third party.

According to a first embodiment of the present invention, there is provided an information processing apparatus. The information processing apparatus includes: a first connection section to which a first power-supply device that has a power-feeding capability or power-feeding and charging capabilities and that is capable of storing unique identification information is connected; a second connection section to which a second power-supply device that has a power-feeding capability and that is capable of storing unique identification information is connected; a setting determiner that determines whether or not identification information is to be set for each of the first power-supply device and the second power-supply device on the basis of a state of connection of the first power-supply device to the first connection section, a state of connection of the second power-supply device to the second connection section, and setting control information specifying whether or not identification information is to be set for each of the first power-supply device and the second power-supply device; an authenticator that selectively obtains, when the setting determiner determines that identification information is not to be set, identification information from the first power-supply device connected to the first connection section and the second power-supply device connected to the second connection section and that authenticates the obtained identification information; an identification-information setter that generates, when the setting determiner determines that identification information is to be set, unique first identification information to be set for the first power-supply device connected to the first connection section, unique second identification information to be set for the second power-supply device connected to the second connection section, and unique third identification information indicating the information processing apparatus in association with each other and that causes the first identification information and the second identification information to be set for the first power-supply device and the second power-supply device, respectively; and a processor that selectively performs executable power-supply-related processing on the basis of a result of the authentication performed by the authenticator or a result of the processing performed by the identification-information setter and of processing control information specifying the executable power-supply-related processing corresponding to a combination of the identification information.

This arrangement restricts use of an unauthorized power-supply device and an unauthorized information processing apparatus, thereby making it possible to inhibit fraudulent obtainment of the power-supply devices and the information processing apparatus by a third party.

When the setting of the first identification information for the first power-supply device and the setting of the second identification information for the second power-supply device are completed, the identification-information setter may notify a user that identification information is settable for another first power-supply device and another second power-supply device. When the another first power-supply device and/or the another second power-supply device is connected to the information processing apparatus, the identification-information setter may cause the first identification information to be set for the first power-supply device and/or may cause the second identification information to be set for the another second power-supply device.

When the setting of the first identification information for the first power-supply device and the setting of the second identification information for the second power-supply device are completed, the identification-information setter may notify a user that identification information is settable for another first power-supply device and another second power-supply device. When the another first power-supply device and/or the another second power-supply device is connected to the information processing apparatus, the identification-information setter may generate unique fourth identification information to be set for the another first power-supply device, unique fifth identification information to be set for the another second power-supply device, and unique six identification formation indicating the information processing apparatus in association with each other and may cause the fourth identification information and the fifth identification information to be set for the another first power-supply device and the another second power-supply device, respectively.

The information processing apparatus further may further include an information manager that manages the setting control information. When the identification information setter causes the identification information to be set, the information managers may update the setting control information to information indicating that identification information is not to be set for the first power-supply device and the second power-supply device. In accordance with user operation, the information manager selectively may update the setting control information to information indicating that identification information is to be set for each of the first power-supply device and the second power-supply device.

The processor may determine an operation mode of the information processing apparatus, and may selectively perform the power-supply-related processing on the basis of a result of the determination of the operation mode.

According to a second embodiment of the present invention, there is provided a power-supply control method. The method includes the steps of: determining whether or not identification information is to be set for each of a first power-supply device that has a power-feeding capability or power-feeding and charging capabilities and that is capable of storing unique identification information and a second power-supply device that has a power-feeding capability and that is capable of storing unique identification information, on the basis of a state of connection of the first power-supply device to a first connection section, a state of connection of the second power-supply device to a second connection section, and setting control information specifying whether or not identification information is to be set for each of the first power-supply device and the second power-supply device; selectively obtaining, when it is determined in the determining step that identification information is not to be set, identification information from the first power-supply device connected to the first connection section and the second power-supply device connected to the second connection section and authenticating the obtained identification information; generating, when it is determined in the determining step that identification information is to be set, unique first identification information to be set for the first power-supply device connected to the first connection section, unique second identification information to be set for the second power-supply device connected to the second connection section, and unique third identification information indicating the information processing apparatus in association with each other and that causing the first identification information and the second identification information to be set for the first power-supply device and the second power-supply device, respectively; and selectively performing executable power-supply-related processing on the basis of a result of the authentication performed in the identification-information obtaining and authenticating step or a result of the processing performed by the identification-information generating and setting step and of processing control information specifying the executable power-supply-related processing corresponding to a combination of the identification information.

The use of the method restricts use of an unauthorized power-supply device and an unauthorized information processing apparatus, thus making it possible to inhibit fraudulent obtainment of the power-supply devices and the information processing apparatus by a third party.

According to a third embodiment of the present invention, there is provided a program for causing a computer to execute the steps of: determining whether or not identification information is to be set for each of a first power-supply device that has a power-feeding capability or power-feeding and charging capabilities and that is capable of storing unique identification information and a second power-supply device that has a power-feeding capability and that is capable of storing unique identification information, on the basis of a state of connection of the first power-supply device to a first connection section, a state of connection of the second power-supply device to a second connection section, and setting control information specifying whether or not identification information is to be set for each of the first power-supply device and the second power-supply device; selectively obtaining, when it is determined in the determining step that identification information is not to be set, identification information from the first power-supply device connected to the first connection section and the second power-supply device connected to the second connection section and authenticating the obtained identification information; generating, when it is determined in the determining step that identification information is to be set, unique first identification information to be set for the first power-supply device connected to the first connection section, unique second identification information to be set for the second power-supply device connected to the second connection section, and unique third identification information indicating the information processing apparatus in association with each other and that causing the first identification information and the second identification information to be set for the first power-supply device and the second power-supply device, respectively; and selectively performing executable power-supply-related processing on the basis of a result of the authentication performed in the identification-information obtaining and authenticating step or a result of the processing performed by the identification-information generating and setting step and of processing control information specifying the executable power-supply-related processing corresponding to a combination of the identification information.

The use of the program restricts use of an unauthorized power-supply device and an unauthorized information processing apparatus, thereby making it possible to inhibit fraudulent obtainment of the power-supply devices and the information processing apparatus by a third party.

According to a fourth embodiment of the present invention, there is provided a power-supply control system. The system includes: a first power-supply device that has a power-feeding capability or power-feeding and charging capabilities and that is capable of storing unique identification information; a second power-supply device that has a power-feeding capability and that is capable of storing unique identification information; and an information processing apparatus to which the first power-supply device and/or the second power-supply device is connected, the information processing apparatus controlling power-supply-related processing in accordance with a combination of the connected first power-supply device and/or the second power-supply device. The information processing apparatus includes: a first connection section to which the first power-supply device is connected; a second connection section to which the second power-supply device is connected; a setting determiner that determines whether or not identification information is to be set for each of the first power-supply device and the second power-supply device on the basis of a state of connection of the first power-supply device to the first connection section, a state of connection of the second power-supply device to the second connection section, and setting control information specifying whether or not identification information is to be set for each of the first power-supply device and the second power-supply device; an authenticator that selectively obtains, when the setting determiner determines that identification information is not to be set, identification information from the first power-supply device connected to the first connection section and the second power-supply device connected to the second connection section and that authenticates the obtained identification information; an identification-information setter that generates, when the setting determiner determines that identification information is to be set, unique first identification information to be set for the first power-supply device connected to the first connection section, unique second identification information to be set for the second power-supply device connected to the second connection section, and unique third identification information indicating the information processing apparatus in association with each other and that causes the first identification information and the second identification information to be set for the first power-supply device and the second power-supply device, respectively; and a processor that selectively performs executable power-supply-related processing on the basis of a result of the authentication performed by the authenticator or a result of the processing performed by the identification-information setter and of processing control information specifying the executable power-supply-related processing corresponding to a combination of the identification information.

This arrangement restricts use of an unauthorized power-supply device and an unauthorized information processing apparatus. Thus, it is possible to realize a power-supply control system that can inhibit fraudulent obtainment of power-supply devices and an information processing apparatus by a third party.

According to the embodiments of the present invention, it is possible to restrict use of an unauthorized power-supply device and an unauthorized information processing apparatus, thus making it possible to inhibit fraudulent obtainment of power-supply devices and an information processing apparatus by a third party.

BRIEF DESCRIPTION OF THE DRAWINGS

FIG. 2 is a table illustrating one example of processing control information according to the embodiment of the present invention;

DESCRIPTION OF THE PREFERRED EMBODIMENTS

Figure 1:
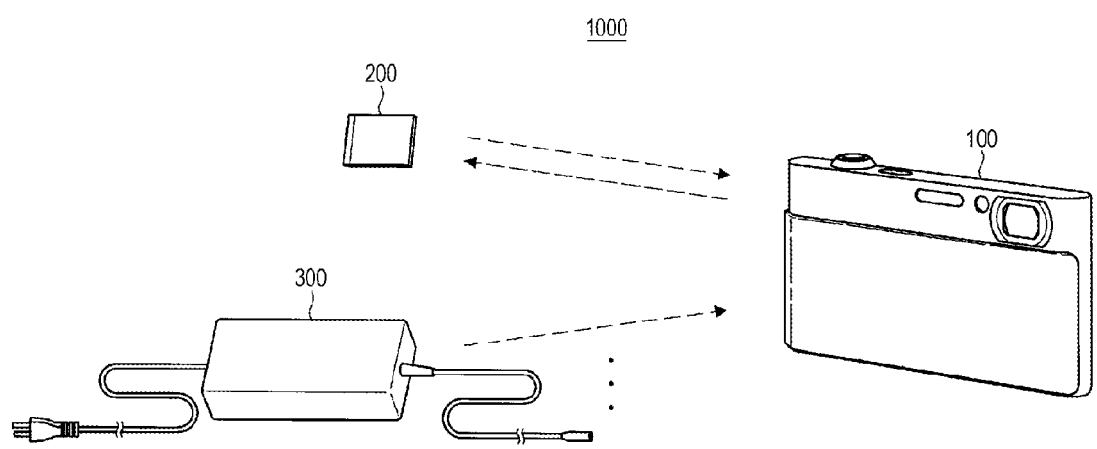
FIG. 1 illustrates an overview of a power-supply control system according to an embodiment of the present invention.

A preferred embodiment of the present invention will be described below in detail with reference to the accompanying drawings. Herein and in the drawings, elements having substantially the same functional configurations are denoted by the same reference numerals, and redundant descriptions are not given.

A description below is given in the following order:

1. Approach according to Embodiment of Present Invention

2. Power-Supply Control System according to Embodiment of Present Invention

3. Program according to Embodiment of Present Invention (Approach According to Embodiment of Present Invention)

Before the configurations of individual devices included in a power-supply control system (hereinafter may be referred to as a "power-supply control system 1000") according to an embodiment of the present invention are described, a description will be given of a power-supply control approach according to the embodiment of the present invention.

[Overview of Power-Supply Control System 1000]

FIG. 1 shows an overview of the power-supply control system 1000 according to the embodiment of the present invention. The power-supply control system 1000 includes an information processing apparatus 100, a first power-supply device 200, and a second power-supply device 300.

The first power-supply device 200 and/or the second power-supply device 300 are connected to the information processing apparatus 100. The information processing apparatus 100 is driven by power fed from the connected power-supply device(s) to perform various types of processing. In the power-supply control system 1000, the information processing apparatus 100 plays a leading role of performing processing according to a power-supply control approach (described below) according to the embodiment of the present invention. The information processing apparatus 100 shown in FIG. 1 has a form of a digital camera, but is not limited thereto.

The first power-supply device 200 can store unique identification information and also has a power-feeding capability or power-feeding and charging capabilities. Upon connection to the information processing apparatus 100, the first power-supply device 200 supplies power to the information processing apparatus 100 or is charged with charging current supplied from the information processing apparatus 100 (when power feeding and charging are possible) in accordance with power-supply control (described below) performed by the information processing apparatus 100. Upon connection to the information processing apparatus 100, the first power-supply device 200 supplies power to the information processing apparatus 100 (when power feeding is possible) in accordance with power-supply control (described below) performed by the information processing apparatus 100.

Identification information in the embodiment of the present invention is unique information for identifying each power-supply device. By obtaining the identification information from each power-supply device, the information processing apparatus 100 can identify which power-supply is currently connected. Examples of the identification information in the embodiment of the present invention include, but are not limited to, an identifier (ID) represented in binary form, hexadecimal form, or the like.

The first power-supply device 200 can also store power-supply-type information indicating the type of power-supply device. In this case, the information processing apparatus 100 can recognize what type of power-supply device the connected first power-supply device 200 is, by obtaining the power-supply-type information from the connected first power-supply device 200. That is, on the basis of the power-supply-type information, the information processing apparatus 100 can recognize, for example, whether the connected first power-supply device 200 is a lithium-ion-alloy-based secondary battery or a lithium-ion-polymer-based secondary battery or whether the connected first power-supply device 200 is a single-cell secondary battery, a secondary battery having two cells connected in series, or a secondary battery having two cells connected in parallel.

Thus, by using the power-supply-type information, the information processing apparatus 100 can perform power-supply control (e.g., power-feed control or charge control) that is suitable for the connected first power-supply device 200.

Examples of the power-supply control suitable for the first power-supply device 200 include, but are not limited to, power-feed control for a maximum power-feed current value of the connected first power-supply device 200 and charge control for a maximum charging current of the connected first power-supply device 200. For example, the information processing apparatus 100 is selectively capable of not performing charging on the basis of the type of the first power-supply device 200. In this case, the information processing apparatus 100 is capable of not performing charging, for example, when the first power-supply device 200 is a primary battery. This arrangement, therefore, can prevent leakage/spillage and deterioration of the primary battery, can enhance safety, and can prevent deterioration of the first power-supply device 200.

Through the use of the power-supply-type information, the information processing apparatus 100 can also perform power-supply control for the connected power-supply device. As an example of the power-supply control for the connected power-supply device, the information processing apparatus 100 may disable use of the information processing apparatus 100 when a combination of the connected power-supply devices can cause a decline in the performance of the connected power-supply device. With this arrangement, the information processing apparatus 100 can prevent a decline in the performance of the connected power-supply device. As one example of the power-supply control for the connected power-supply device, when the information processing apparatus 100 fails to receive the power-supply-type information from the connected power-supply device, the information processing apparatus 100 may disable use of the information processing apparatus 100, by using the power-supply-type information. In the case described above, since there is a possibility that a combination of the connected power-supply devices causes a decline in the performance of the power-supply device, the information processing apparatus 100 can prevent a decline in the performance of the connected power-supply device.

One example of the first power-supply device 200 is, but is not limited to, a secondary battery, such as a lithium-ion secondary battery or a lithium-ion polymer secondary battery. For example, the first power-supply device 200 may be a primary battery.

The second power-supply device 300 can store unique identification information and also has a power-feeding capability. Upon connection to the information processing apparatus 100, the second power-supply device 300 supplies power to the information processing apparatus 100 in accordance with power-supply control (described below) performed by the information processing apparatus 100.

The second power-supply device 300 can also store power-supply-type information indicating the type of power-supply device. In this case, the information processing apparatus 100 can recognize what type of power-supply device the connected second power-supply device 300 is, by obtaining the power-supply-type information from the connected second power-supply device 300. More specifically, on the basis of the power-supply type information, the information processing apparatus 100 can recognize, for example, whether the connected second power-supply device 300 is an AC (alternating current) adapter or an externally battery. In addition, in the case of the AC adapter, the information processing apparatus 100 can recognize, for example, whether the AC adapter is for 4.2 V or 8.4 V.

Thus, by using the power-supply-type information, the information processing apparatus 100 can perform power-supply control (e.g., power-feed control) that is suitable for the connected second power-supply device 300. Examples of the power-supply control suitable for the second power-supply device 300 include, but are not limited to, power-feed control for a maximum power-feed current value of the connected second power-supply device 300 and power-feed control based on a maximum charging current of the connected first power-supply device 200. For example, when the first power-supply device 200 is a secondary battery and the second power-supply device 300 is a fuel battery, the information processing apparatus 100 can use the fuel battery and the secondary battery after confirming that the secondary battery is compatible with the fuel battery. In this case, the information processing apparatus 100 can prevent the fuel battery from being deteriorated by a current exceeding a specified value and also can prevent decline of the performance of the fuel battery.

Examples of the second power-supply device 300 include, but are not limited to, an AC adapter, a solar battery, a fuel battery, an external battery (e.g., an external primary or secondary battery), and a manually operated power generator.

In the power-supply control system 1000, for example, as shown in FIG. 1, the first power-supply device 200 and/or the second power-supply device 300 are selectively connected to the information processing apparatus 100. In the power-supply control system 1000, the information processing apparatus 100 performs power-supply control (described below) to selectively feed power to the information processing apparatus 100 and charge the first power-supply device 200.

Although a configuration in which the power-supply control system 1000 includes two power-supply devices is illustrated in FIG. 1, the power-supply control system according to the embodiment of the present invention is not limited thereto. For example, the power-supply control system according to the embodiment of the present invention may have a configuration in which three or more power-supply devices are connected to the information processing apparatus 100. Even with such a configuration, the power-supply control system according to the embodiment of the present invention can perform power-supply control of the power-supply devices connected to the information processing apparatus 100 by employing a power-supply control approach described below.

[Overview of Power-Supply Control Approach]

An overview of a power-supply control approach according to the embodiment of the present invention will be described next. The following description is given in conjunction primarily with an example in which the power-supply control system according to the embodiment of the present invention has a configuration in which, as shown in FIG. 1, two power-supply devices, i.e., the first power-supply device 200 and the second power-supply device 300, can be connected to the information processing apparatus 100. The first power-supply device 200 and the second power-supply device 300 that can be connected to the information processing apparatus 100 may be collectively referred to as "power-supply devices" hereinafter.

As described above, the above-described information processing apparatus of the related art using the related technology merely selectively activates the power-supply device on the basis of determination as to the identification information of the power-supply device and determination as to whether or not the any of the predetermined conditions is satisfied. Thus, with the related technology, it is still difficult to restrict use of an unauthorized power-supply device and an unauthorized information processing apparatus that are fraudulently obtained (e.g., stolen) by a third party.

In the power-supply control system 1000, the information processing apparatus 100 selectively generates unique identification information for the first power-supply device 200 and/or the second power-supply device 300 to be permitted for use and identification information for the information processing apparatus 100 and sets the generated unique identification information for the power-supply device(s). Upon connection of the power-supply device(s), the information processing apparatus 100 selectively performs executable power-supply-related processing on the basis of the identification information for the information processing apparatus 100, the identification information for the connected power supply(s), and processing control information. The processing control information in the embodiment of the present invention is information that specifies executable power-supply-related processing in accordance with a combination of the identification information.

[Example of Processing Control Information]

FIG. 2 is a table showing one example of the processing control information in the embodiment of the present invention. More specifically, FIG. 2 shows an example of the processing control information when the information processing apparatus 100 is a digital camera, the first power-supply device 200 is a secondary battery, and the second power-supply device 300 is an AC adapter. In the example shown in FIG. 2, each piece of identification information is a unique ID.

Columns denoted by A in FIG. 2 indicate combinations of the power-supply devices connected to the information processing apparatus. Columns B, C, and D shown in FIG. 2 indicate power-supply-related processing and specify whether or not the power-supply-related processing is executable with each combination shown in the columns A in FIG. 2.

In this case, "O" shown in the columns A in FIG. 2 indicates a case in which a piece of identification information generated by the information processing apparatus 100 is set for the information processing apparatus 100 or the connected power-supply device. Also, "x" shown in the columns A in FIG. 2 indicates a case in which a piece of identification information generated by the information processing apparatus 100 is not set for the information processing apparatus 100 or the connected power-supply device or a case in which no power-supply device is connected to the information processing apparatus 100. Also, "O" shown in columns B, C, and D in FIG. 2 indicates that the corresponding power-supply-related processing is executable and "x" shown in the columns B, C, and D in FIG. 2 indicates that the corresponding power-supply-related processing is not executable. The first combination from the top in the columns A in FIG. 2 indicates a default state, for example, a state at the time of factory shipment or the like.

Thus, when the power-supply device whose use is permitted by the information processing apparatus 100 (i.e., the power-supply device for which the information processing apparatus 100 has set the identification information) is connected, the information processing apparatus 100 can selectively perform executable power-supply-related processing by using the processing control information, for example, shown in FIG. 2. The power-supply-related processing according to the embodiment of the present invention is not limited to the processing shown in FIG. 2. For example, the processing control information in the embodiment of the present invention may include processing restricted during power feeding (which processing is processing other than the power-supply-related processing) and processing automatically executed upon power feeding (which processing is processing other than the power-supply-related processing).

In the power-supply control system 1000, as described above, the information processing apparatus 100 can restrict the executable power-supply-related processing on the basis of the identification information and the processing control information. That is, in the power-supply control system 1000, for example, even when a power-supply device stolen by a malicious third party is connected to the information processing apparatus 100, the power-supply-related processing using the stolen power-supply device is restricted. For example, if a malicious third party steals the information processing apparatus 100 and connects an authorized power-supply device thereto, the information processing apparatus 100 can restrict the power-supply-related processing using the power-supply device.

Thus, since the use of the power-supply control approach according to the embodiment of the present invention can restrict use of an unauthorized power-supply device and an unauthorized information processing apparatus and thus can inhibit fraudulent obtainment by a third party.

[Processing According to Power-Supply Control Approach]

The processing performed by the information processing apparatus 100 according to the above-described power-supply control approach will be described next in more detail. in this case, one example of the processing (described below) according to the power-supply control approach according to the embodiment of the present invention can be construed as one example of the processing according to a power-supply control method according to the embodiment of the present invention.

1. First Example of Processing According to Power-Supply Control Approach

Figure 3:
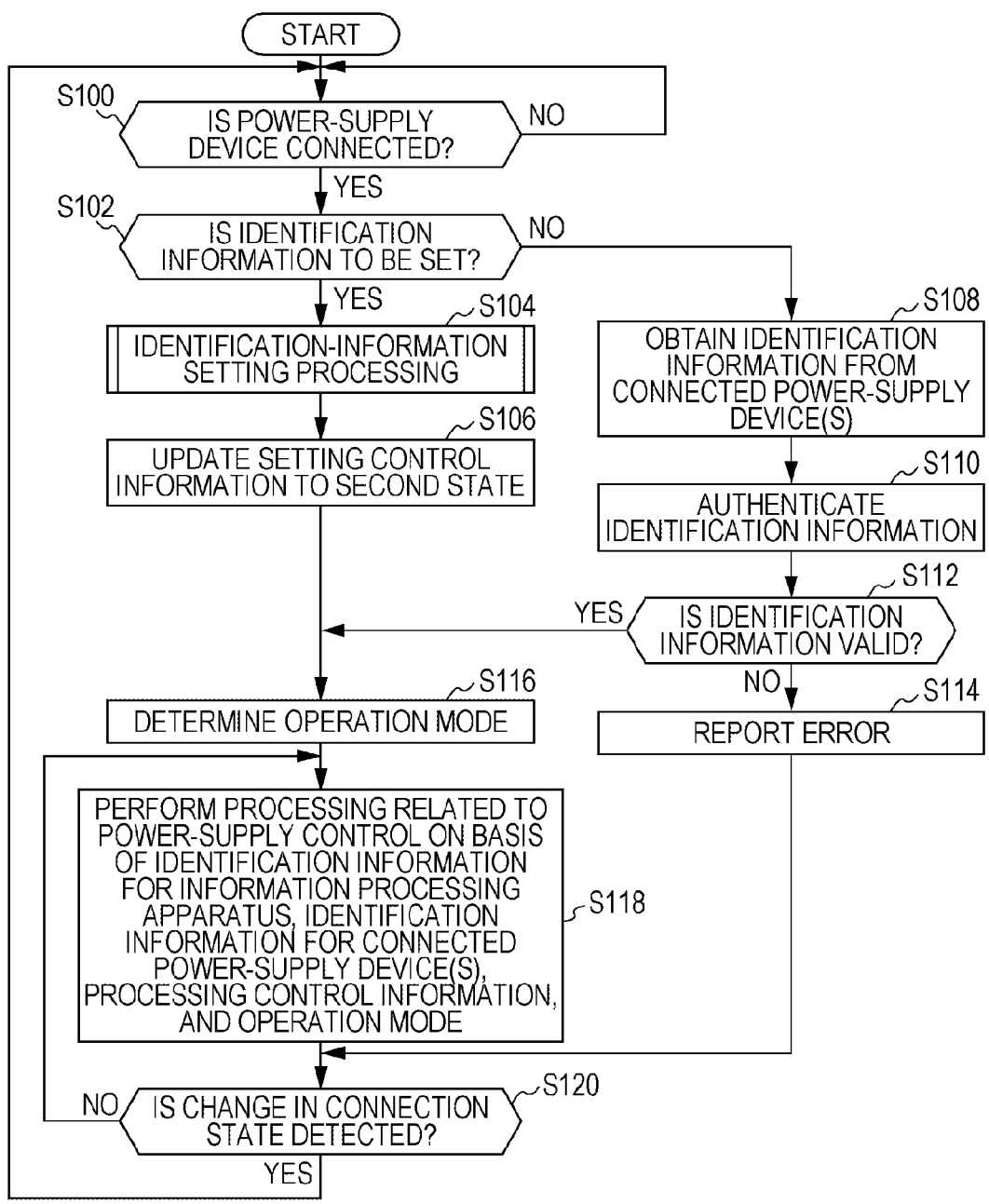
FIG. 3 is a flow diagram showing a first example of processing according to a power-supply control approach for the information processing apparatus according to the embodiment of the present invention.

FIG. 3 is a flow diagram showing a first example of processing according to the power-supply control approach for the information processing apparatus 100 according to the embodiment of the present invention.

In step S100, the information processing apparatus 100 determines whether or not any power-supply device is connected. The processing in step S100 is performed, for example, when power feeding from the power-supply device connected to the information processing apparatus 100 is started.

The information processing apparatus 100 can make the determination in step S100 by detecting a state of connection of the first power-supply device 200 to a first connection section to which the first power-supply device 200 is connected and a state of connection of the second power-supply device 300 to a second connection section to which the second power-supply device 300 is connected.

The state of connection to the first connection section and the state of connection to the second connection section can be detected by, for example, any of methods described below. Needless to say, a method for detecting the state of connection to the information processing apparatus 100 according to the embodiment of the present invention is not limited to the methods describe below. The first connection section and the second connection section provided in the information processing apparatus 100 may be collectively referred to as "connection sections" hereinafter.

[Example of Detection Methods of Connection State]

Detection may be performed based on ON (i.e., a state in which the power-supply device is connected)/OFF (i.e., a state in which no power-supply device is connected) of a mechanical switch provided in the connection section.

Detection may be performed based on a signal level of a signal line. For example, when the power-supply device is connected to the connection section, a high-level signal line is brought into contact with a low-level terminal to cause the signal level to change from the high level to the low level, so that a change in the connection state is detected.

Detection may be performed using an AD (analog-to-digital) converter to measure the level of an unregulated voltage supplied from the power-supply device and determining whether or not a result of the measurement is larger than or equal to a reference value.

For example, by using any of the above-described detection methods, the information processing apparatus 100 can detect the respective states of connection to the first connection section and the second connection section. By detecting the state of connection to each connection section, the information processing apparatus 100 can also detect a change in the connection state of the connection section. Thus, the information processing apparatus 100 can detect attachment/removal of each power-supply device.

When it is determined in step S100 that no power-supply device is connected, the information processing apparatus 100 does not advance the process.

When it is determined in step S100 the power-supply device(s) is connected, the process proceeds to step S102 in which the information processing apparatus 100 determines whether or not identification information is to be set. The information processing apparatus 100 makes the determination in step S102, for example, on the basis of setting control information.

The setting control information in the embodiment of the present invention is information that specifies whether or not identification information is to be set for the connected first power-supply device 200 and/or second power-supply device 300. For example, during manufacture or shipment of the information processing apparatus 100, the setting control information in the embodiment of the present invention is set to a "mode in which the identification information is to be set", and during identification-information setting processing (described below) of the information processing apparatus 100, the setting control information can be updated to a "mode in which no identification information is to be set".

One example of the setting control information in the embodiment of the present invention is, but is not limited to, a flag (e.g., a 1-bit flag) having a value specifying whether or not identification information is to be set. For example, when the information processing apparatus 100 makes the determination in step S102 on the basis of whether or not the setting control information is stored, the information processing apparatus 100 may use, as setting control information, data in a arbitrary format with which the information processing apparatus 100 can identify that the data is setting control information.

A description below is given of an example in which the setting control information in the embodiment of the present invention is a flag. A case in which the setting control information indicates that identification information is to be set and a case in which the setting control information indicates that no identification information is to be set are hereinafter referred to as a "first state" and a "second state", respectively.

When it is determined in step S102 that identification information is to be set, the process proceeds to step S104 in which the information processing apparatus 100 performs identification-information setting processing.

[Examples of Identification-Information Setting Processing]

1. First Example of Identification-Information Setting Processing

Figure 4:
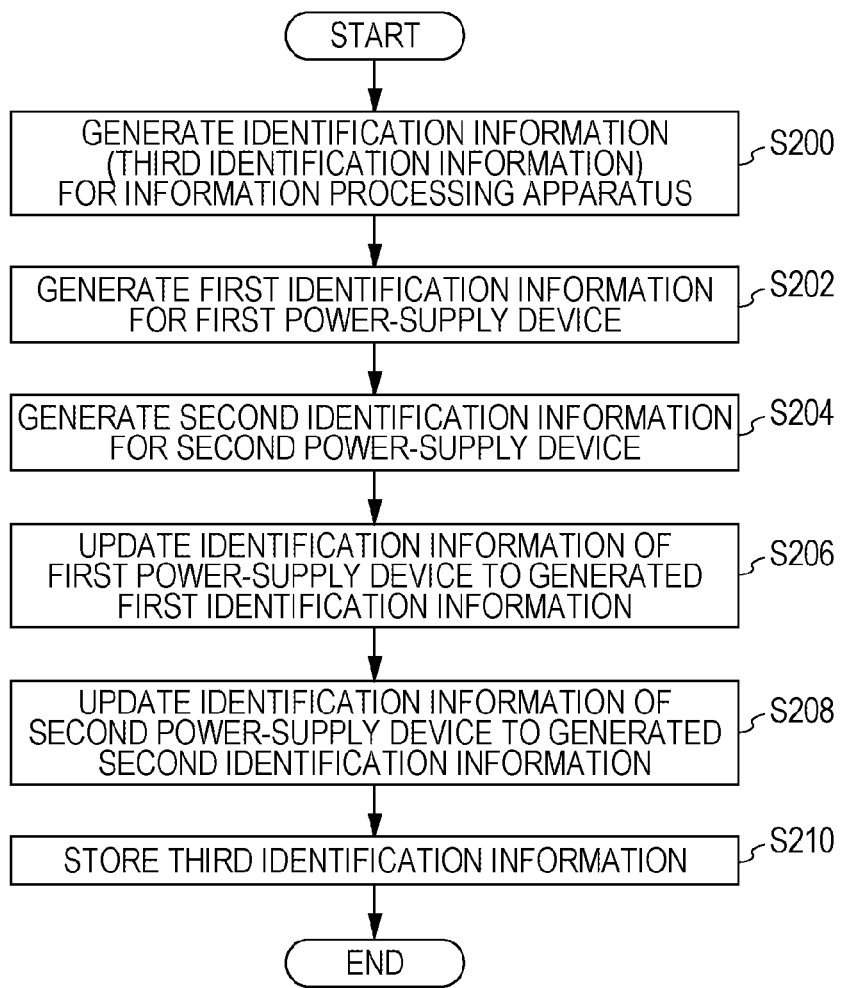
FIG. 4 is a flow diagram showing a first example of identification-information setting processing performed by the information processing apparatus according to the embodiment of the present invention.

FIG. 4 is a flow diagram showing a first example of the identification-information setting processing performed by the information processing apparatus 100 according to the embodiment of the present invention.

In step S200, the information processing apparatus 100 generates identification information for the information processing apparatus 100 (this identification information may hereinafter be referred to as "third identification information").

For example, for generation of 4-bit third identification information, the information processing apparatus 100 uses, as the third identification information, bottom four bits of serial-number data pre-stored in the information processing apparatus 100 during factory shipment or the like, but is not limited thereto. For example, the information processing apparatus 100 may generate 4-bit data by giving rise to a random number and use the data as the third identification information. Needless to say, a method for the third-identification-information generation performed by the information processing apparatus 100 according to the embodiment of the present invention is not limited to the above-described example.

In step S202, the information processing apparatus 100 generates first identification information for the first power-supply device 200.

For example, for generation of 8-bit first identification information, the information processing apparatus 100 obtains, from the first power-supply device 200, identification information stored therein. The information processing apparatus 100 then generates the first identification information by replacing top four bits of the obtained identification information with the third identification information. Consequently, the information processing apparatus 100 can generate the first identification information associated with the third identification information. When identification information is not obtainable from the first power-supply device 200, the information processing apparatus 100 can abort the identification-information setting processing by regarding the first power-supply device 200 as an unauthorized power-supply device that is not supported by the information processing apparatus 100. Needless to say, a method for the first-identification-information generation performed by the information processing apparatus 100 according to the embodiment of the present invention is not limited to the above-described example.

In step S204, the information processing apparatus 100 generates second identification information for the second power-supply device 300.

For example, for generation of 8-bit second identification information, the information processing apparatus 100 obtains, from the second power-supply device 300, identification information stored therein, for example, as in step S202. The information processing apparatus 100 then generates the second identification information by replacing top four bits of the obtained identification information with the third identification information, for example, as in step S202. Consequently, the information processing apparatus 100 can generate the second identification information associated with the third identification information. When identification information is not obtainable from the second power-supply device 300, the information processing apparatus 100 can abort the identification-information setting processing by regarding the second power-supply device 300 as an unauthorized power-supply device that is not supported by the information processing apparatus 100. Needless to say, a method for the second-identification-information generation performed by the information processing apparatus 100 according to the embodiment of the present invention is not limited to the above-described example.

Although FIG. 4 shows an example in which the information processing apparatus 100 performs the processing in step S204 after finishing the processing in step S202, the order of the processing is not limited thereto. For example, the information processing apparatus 100 can perform the processing in step S202 and the processing in step S204 independently from each other. More specifically, for example, the information processing apparatus 100 can perform the processing in step S202 after finishing the processing in step S204 or can perform the processing in step S202 and the processing in step S204 in synchronization with each other.

In step S206, the information processing apparatus 100 causes the identification information, stored in the first power-supply device 200, to be updated to the first identification information generated in step S202. In this case, the information processing apparatus 100 performs the processing in step S206, for example, by transmitting, to the first power-supply device 200, the first identification information and an update instruction for updating the stored identification information. The processing, however, is not limited to this example.

The information processing apparatus 100 also recognizes whether or not the processing in step S206 is properly finished, for example, on the basis of a result of processing corresponding to the update instruction transmitted from the first power-supply device 200. Needless to say, when the result of the processing indicates that the update of the identification information is not properly finished, the information processing apparatus 100 can repeat the processing in step S206.

In step S208, the information processing apparatus 100 causes the identification information, stored in the second power-supply device 300, to be updated to the second identification information generated in step S204. In this case, for example, as in step S206, the information processing apparatus 100 performs the processing in step S208 by transmitting, to the second power-supply device 300, the second identification information and an update instruction for updating the stored identification information. The processing, however, is not limited to this example.

For example, as in step S206, the information processing apparatus 100 can also recognize whether or not the processing in step S208 is properly completed, on the basis of a result of processing corresponding to the update instruction transmitted from the second power-supply device 300. Needless to say, when the result of the processing indicates that the update of the identification information is not properly finished, the information processing apparatus 100 can repeat the processing in step S208.

Although FIG. 4 shows an example in which the information processing apparatus 100 performs the processing in step S208 after finishing the processing in step S206, the order of the processing is not limited thereto. For example, the information processing apparatus 100 can perform the processing in step S206 and the processing in step S208 independently from each other. More specifically, for example, the information processing apparatus 100 can perform the processing in step S206 after finishing the processing in step S208 or can perform the processing in step S206 and the processing in step S208 in synchronization with each other.

When the updates of the identification information for the power-supply devices are completed in steps S206 and S208, the process proceeds to step S210 in which the information processing apparatus 100 stores the third identification information.

When the information processing apparatus 100 already stores the same identification information as the third identification information generated in steps S200 to S204, the information processing apparatus 100 stores the identification information, for example, by overwriting. The storage of the identification information, however, is not limited to this example. For example, in the case described above, the arrangement may also be such that the information processing apparatus 100 does not store the identification information.

In step S210, the information processing apparatus 100 according to the embodiment of the present invention may also store the generated first identification information, second identification information, and third identification information in association with each other.

For example, in the processing shown in FIG. 4, the information processing apparatus 100 can set the identification information, generated by the information processing apparatus 100, for the connected power-supply devices.

When no identification information is obtainable from the first power-supply device 200 and/or the second power-supply device 300, the information processing apparatus 100 can abort the identification-information setting processing by regarding the power-supply device(s) as unauthorized power-supply device(s) that are not supported by the information processing apparatus 100. Thus, for example, when the information processing apparatus 100 employs the processing shown in FIG. 4, the identification information is more reliably set for the connected power-supply device(s) after the identification-information setting processing is properly finished.

2. Second Example of Identification-Information Setting Processing

The identification-information setting processing performed by the information processing apparatus 100 according to the embodiment of the present invention is not limited to the processing in the first example shown FIG. 4. For example, the information processing apparatus 100 can also generate first identification information for multiple first power-supply devices and set the generated first identification information therefor and can generate second identification information for multiple second power-supply devices and set the generated second identification information therefor.

Figure 5:
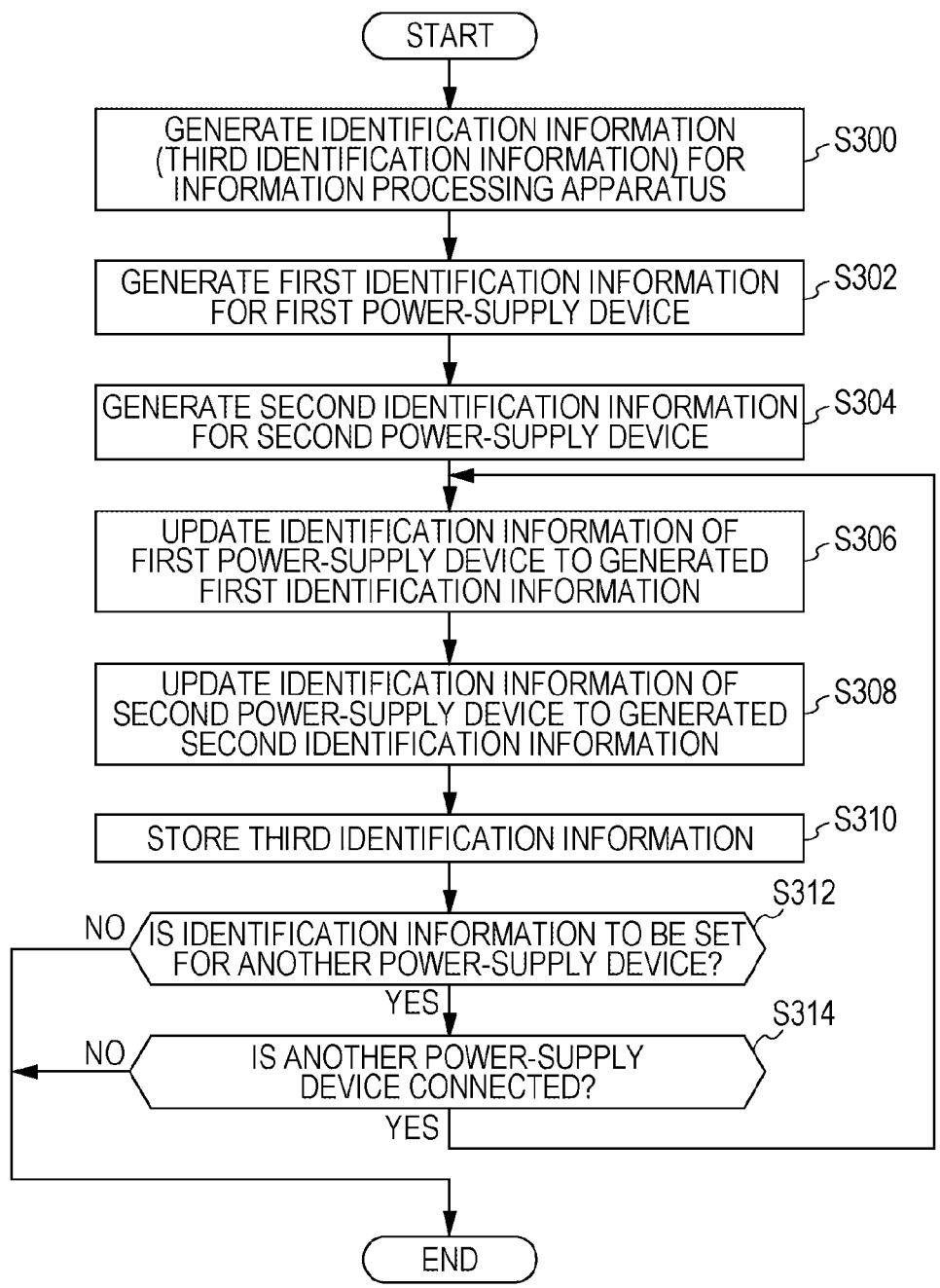
FIG. 5 is a flow diagram showing a second example of the identification-information setting processing performed by the information processing apparatus according to the embodiment of the present invention.

FIG. 5 is a flow diagram showing a second example of the identification-information setting processing performed by the information processing apparatus 100 according to the embodiment of the present invention.

In step S300, the information processing apparatus 100 generates identification information (third identification information) for the information processing apparatus 100, as in step S200.

In step S302, the information processing apparatus 100 generates first identification information for the first power-supply device 200, as in step S202. In step S304, the information processing apparatus 100 generates second identification information for the second power-supply device 300, as in step S204.

In step S306, the information processing apparatus 100 causes identification information, stored in the first power-supply device 200, to be updated to the first identification information generated in step S302, as in step S206.

In step S308, the information processing apparatus 100 causes identification information, stored in the second power-supply device 300, to be updated to the second identification information generated in step S304, as in step S208.

When the updates of the identification information for the power-supply devices are completed in steps S306 and S308, the process proceeds to step S310 in which the information processing apparatus 100 stores the third identification information, as in step S310.

When the processing in step S310 is finished, the process proceeds to step S312 in which the information processing apparatus 100 determines whether or not the identification information is to be set for another power-supply device.

In this case, for example, the information processing apparatus 100 notifies the user of the information processing apparatus 100 (this user may hereinafter be referred to as a "user") that the identification information can be set for another power-supply device. When an operation signal indicating that the identification information is to be set is received from an operation section (described below) in a predetermined period of time, the information processing apparatus 100 determines that the identification information is to be set. The determination processing, however is not limited to this example. Examples of a method for notifying the user of the information processing apparatus 100 include, but are not limited to, displaying a notification on a display screen and issuing a notification using sound.

When it is determined in step S312 that the identification information is not to be set for another power-supply device, the information processing apparatus 100 ends the identification-information setting processing.

When it is determined in step S312 that identification information is to be set for another power-supply device, the process proceeds to step S314 in which the information processing apparatus 100 determines whether or not another power-supply device is connected. For example, when a change in the connection state is detected in a predetermined period of time, the information processing apparatus 100 determines that another power-device is connected.

When it is determined in step S314 that another power-supply device is not connected, the information processing apparatus 100 ends the identification-information setting processing.

When it is determined in step S314 that another power-supply device is connected, the information processing apparatus 100 repeats the processing in step S306 and the subsequent steps.

For example, in the processing shown in FIG. 5, the information processing apparatus 100 can set the identification information, generated by the information processing apparatus 100, for multiple power-supply devices. That is, when the information processing apparatus 100 performs the processing shown in FIG. 5 as the identification-information setting processing, identification information can be set for, for example, a backup battery (which is one example of the first power-supply device 200) in the possession of the user or a backup AC adapter (which is one example of the second power-supply device 300). Thus, when the information processing apparatus 100 performs the processing shown in FIG. 5 as the identification-information setting processing, it is possible to further enhance usability while inhibiting fraudulent obtainment by a third party.

3. Third Example of Identification-Information Setting Processing

The identification-information setting processing for the information processing apparatus 100 according to the embodiment of the present invention, the processing allowing the identification information generated by the information processing apparatus 100 to be set for multiple power-supply devices, is not limited to the second embodiment shown in FIG. 5. For example, the information processing apparatus 100 can also set different pieces of identification information for multiple first power-supply devices and can set different pieces of identification information for multiple second power-supply devices.

Figure 6:
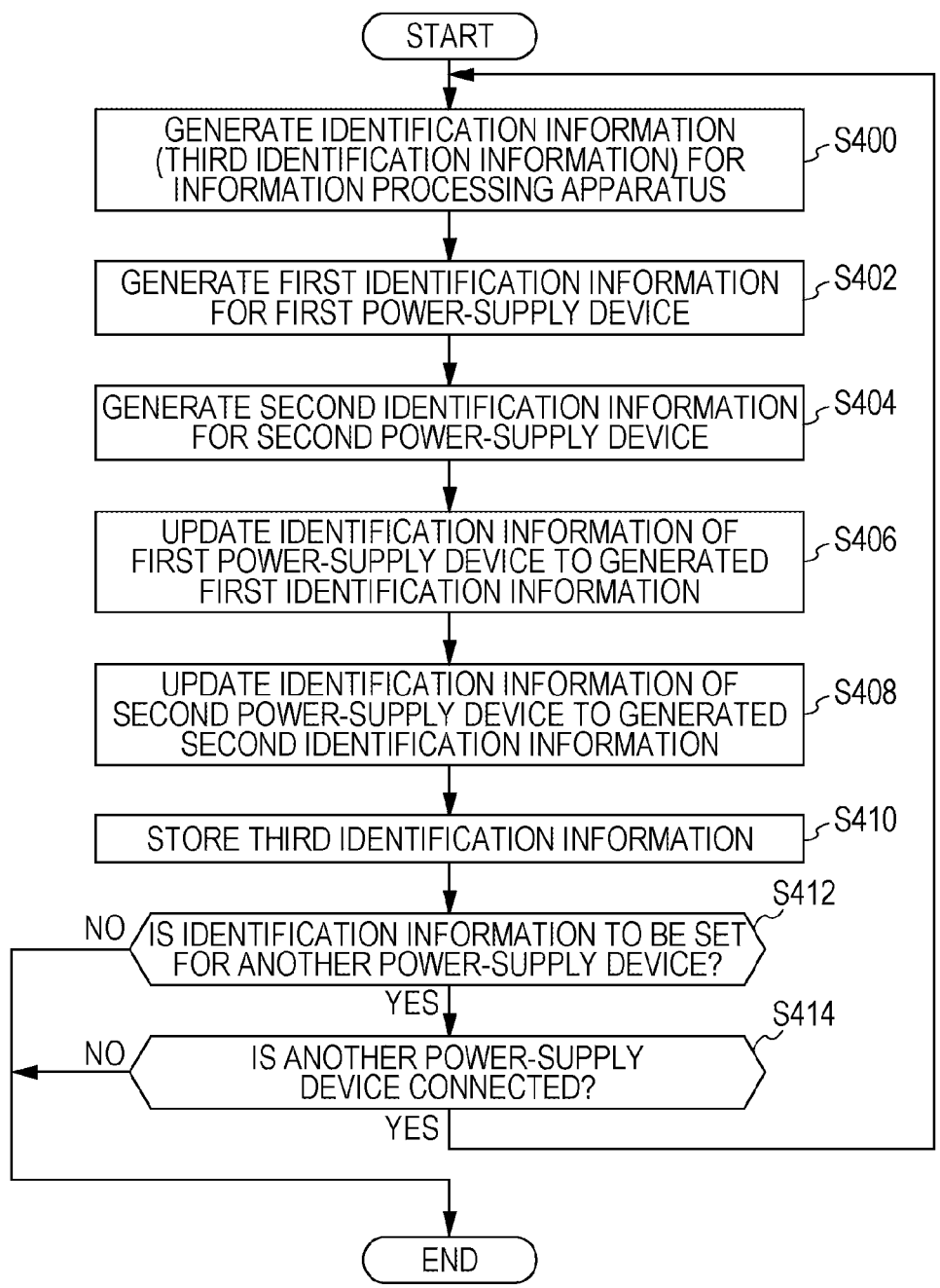
FIG. 6 is a flow diagram showing a third example of the identification-information setting processing performed by the information processing apparatus according to the embodiment of the present invention.

FIG. 6 is a flow diagram showing a third example of the identification-information setting processing performed by the information processing apparatus 100 according to the embodiment of the present invention.

The processes in the processing in the third example shown in FIG. 6 are analogous to the processes in the processing in the second example shown in FIG. 5, but are different in that processing that is repeated is different depending on a determination in step S414. More specifically, when it is determined in step S414 that another power-supply device is connected, the information processing apparatus 100 repeats processing in step S400 and the subsequent steps, rather than repeating the processing in step S406 and the subsequent steps as in the processing in the second example shown in FIG. 5.

As a result of the repeated processing in step S400 and the subsequent steps, as shown in FIG. 6, the information processing apparatus 100 generates multiple sets of first identification information, second identification information, and third identification information which are associated with each other. Thus, for example, when the information processing apparatus 100 is shared by multiple users, the processing shown in FIG. 6 allows the information processing apparatus 100 to be operated with the different power-supply devices of the respective users. When the information processing apparatus 100 performs the processing in the third embodiment shown in FIG. 6, for example, pieces of third identification information are associated with different pieces of processing control information and other various types of processing so that the information processing apparatus 100 can perform a different operation in accordance with the set of the connected power-supply devices. Thus, when the processing in the third embodiment shown in FIG. 6 is performed, it is possible to further enhance usability.

The processing in the third embodiment shown in FIG. 6 includes the processing that is analogous to the processing in the second example shown in FIG. 5. Thus, when the processing in the third example shown in FIG. 6 is performed, the information processing apparatus 100 can further enhance usability while inhibiting fraudulent obtainment by a third party, as in the case in which the processing in the second example shown in FIG. 5 is performed. In the processing in the third example, multiple pieces of first identification generated in the repeated processing, multiple pieces of second identification information generated in the repeated processing, and multiple pieces of third identification information generated in the repeated processing can be regarded as "fourth identification information", "fifth identification information", and "sixth identification information", respectively.

The information processing apparatus 100 performs, for example, the processing in first to the third examples as the identification-information setting processing. Needless to say, the identification-information setting processing according to the embodiment of the present invention is not limited to the processing in the first to third examples.

The first example of the processing according to the power-supply control approach according to the embodiment of the present invention will now be described with reference back to FIG. 3. When the setting of the identification information in step S104 is finished, the process proceeds to step S106 in which the information processing apparatus 100 updates the setting control information to the second state. As a result of the processing in step S106, the information processing apparatus 100 can prevent identification information to be unlimitedly set for the power-supply devices.

When the update of the setting control information in step S106 is finished, the information processing apparatus 100 performs processing in step S116 described below.

When it is determined in step S102 that no identification information is to be set, the process proceeds to step S108 in which the information processing apparatus 100 obtains the identification information from the connected power-supply devices.

In this case, for example, the information processing apparatus 100 directly obtains the identification information from the power-supply devices connected to the connection sections, by transmitting, to the power-supply devices via the connection sections, an identification-information transmission instruction for requesting transmission of the identification information. The processing, however, is not limited to this example. For example, the arrangement may also be such that the information processing apparatus 100 sequentially transmits settable-identification information (e.g., an ID) via each connection section, so that upon receiving a response from the power-supply device, the information processing apparatus 100 can use the identification information corresponding to the response as the identification information of the connected power-supply device (i.e., can indirectly obtain the identification information).

When the identification information is obtained in step S108, the process proceeds to step S110 in which the information processing apparatus 100 authenticates the obtained identification information.

In this case, the information processing apparatus 100 performs the processing in step S110, for example, on the basis of whether or not the obtained identification information is identification information with which the third identification information stored in the processing in step S104 is associated. More specifically, for example, when predetermined bits (e.g., top four bits) of the obtained identification information matches the third identification information stored in the processing in step S104, the information processing apparatus 100 determines that the obtained identification information is valid.

A method for the authentication performed by the information processing apparatus 100 according to the embodiment of the present invention is not limited to the above-described example. For example, when the information processing apparatus 100 stores the first identification information and/or second identification information generated in the processing in step S104, the information processing apparatus 100 can perform the processing in step S110 on the basis of whether or not the obtained identification information matches one of the stored first identification information and second identification information.

When the authentication in step S110 is performed, the process proceeds to step S112. In step S112, on the basis of a result of the processing in step S108, the information processing apparatus 100 determines whether or not the identification information obtained in step S108 is valid.

When it is determined in step S112 that the identification information is not valid, the process proceeds to step S114 in which the information processing apparatus 100 reports an error. The information processing apparatus 100 then performs processing in step S120 described below without performing the power-supply-related processing.

When it is determined in the processing in step S106 that the update of the setting control information is finished or when it is determined in step S112 that the identification information is valid, the process proceeds to step S116. In step S116, the information processing apparatus 100 determines an operation mode of the information processing apparatus 100.

Examples of the operation mode of the information processing apparatus 100, the operation mode being determined in step S116, include, but are limited to, a mode indicating whether or not the information processing apparatus 100 is in a standby state (e.g., whether a power-supply switch is on or off), a mode indicating whether or not the information processing apparatus 100 is in a power-saving state in which a function thereof is restricted, and a mode indicating whether or not the power saving mode is cleared.

The information processing apparatus 100 also uses the operation mode, determined in step S116, as the operation mode used for the power-supply control. The use of the operation mode to perform the power-supply control as described above allows the information processing apparatus 100 to realize power-supply control that is suitable for the operation mode. Thus, in this case, the information processing apparatus 100 can more easily realize, for example, extension of the period of drive time using a secondary battery (which is one example of the first power-supply device 200) and reduction of the period of time for charging the secondary battery.

Needless to say, when the information processing apparatus 100 does not perform the power-supply control on the basis of the operation mode, the information processing apparatus 100 does not necessarily have to perform the processing in step S112. In this case, power-supply control can also be performed through processing in step S118 described below (strictly speaking, a modification of the processing in step S118). Processing according to the power-supply control approach according to the embodiment of the present invention will now be described in conjunction primarily with an example in which the information processing apparatus 100 uses the operation mode to perform the power-supply control.

When the operation mode in step S116 is determined, the process proceeds to step S118. In step S118, the information processing apparatus 100 performs processing related to power-supply control, on the basis of the identification information (the third identification information) for the information processing apparatus 100, the identification information for the connected power-supply device(s) (the first identification information and/or the second identification information), the processing control information, and the operation mode.

More specifically, the information processing apparatus 100 identifies an identification-information combination (e.g., one of the combinations shown in the columns A in FIG. 2) on the basis of the obtained identification information, the stored identification information, and the processing control information and identifies executable power-supply-related processing (e.g., one of the types of processing shown in the columns B to D in FIG. 2) for the identified combination. The information processing apparatus 100 selectively executes executable power-supply-related processing in accordance with the identified executable power-supply-related processing and the operation mode determined in step S116.

For example, when the information processing apparatus 100 identifies a combination shown in a row E in FIG. 2, the information processing apparatus 100 is restricted in charging the first power-supply device 200 and power feeding from the second power-supply device 300, regardless of the operation mode determined in step S116.

For example, when the information processing apparatus 100 identifies a combination shown in a row F in FIG. 2, power feeding from the power-supply devices and charging of the first power-supply device 200 are not restricted. In this case, the processing is controlled in accordance with, for example, the operation mode determined in step S116. For example, when the power-supply switch is on, the information processing apparatus 100 preferentially performs power feeding from the first power-supply device 200 or the second power-supply device 300, and when the power-supply switch is off, the information processing apparatus 100 preferentially charges the first power-supply device 200.

The processing related to the power-supply control according to the embodiment of the present invention is not limited to the above-described processing. For example, when the information processing apparatus 100 does not perform power-supply control on the basis of the operation mode, the information processing apparatus 100 can perform processing related to power-supply control on the basis of the identification information and the processing control information.

When the processing related to the power-supply control is performed in step S118, the process proceeds to step S120 in which the information processing apparatus 100 determines whether or not a change in the connection state is detected.

When it is determined in step S120 that a change in the connection state is not detected, the information processing apparatus 100 repeats the processing in step S118 and the subsequent step. When it is determined in step S120 that a change in the connection state is detected, the information processing apparatus 100 repeats the processing in step S100 and the subsequent steps.

The information processing apparatus 100 can realize the above-described power-supply control approach by performing, for example, the processing shown in FIG. 3. Thus, for example, through the processing shown in FIG. 3, the information processing apparatus 100 restricts use of an unauthorized power-supply device and an unauthorized information processing apparatus, thereby making it possible to inhibit fraudulent obtainment of the power-supply devices and the information processing apparatus by a third party.

The processing in the first example according to the power-supply control approach for the information processing apparatus 100 according to the embodiment of the present invention is not limited to the processing shown in FIG. 3. For example, although FIG. 3 shows an example in which the information processing apparatus 100 performs the processing in step S120 without performing the power-supply-related processing after finishing the processing in step S114, the information processing apparatus 100 can also perform the processing in step S116 (or step S118) after finishing the processing in step S114. Even in such a case, through use of the authentication result obtained in the processing in step S110 and, for example, the processing control information shown in FIG. 2, the information processing apparatus 100 can restrict use of a power-supply device for which no identification information is set by the information processing apparatus 100. Thus, even in such a case, the information processing apparatus 100 can also inhibit fraudulent obtainment of the power-supply devices and the information processing apparatus by a third party, by restricting use of an unauthorized power-supply device and an unauthorized information processing apparatus.

When it is determined in step S110 in FIG. 3 that the obtained identification information is not valid and the predetermined bits (e.g., top four bits) of the first identification information and the third identification information match each other, the information processing apparatus 100 can also reset the identification information in the processing in step S104. In this case, for example, when the user newly purchases a first power-supply device 200 and a second power-supply device 300, it is possible to make the first power-supply device 200 and the second power-supply device 300 usable in combination with the information processing apparatus 100. Thus, in this case, the information processing apparatus 100 can enhance usability. In the case describe above, for example, by placing a restriction on the number of times the identification information can be reset, the information processing apparatus 100 can prevent unlimited resetting.

2. Second Example of Processing According to Power-Supply Control Approach

Figure 7:
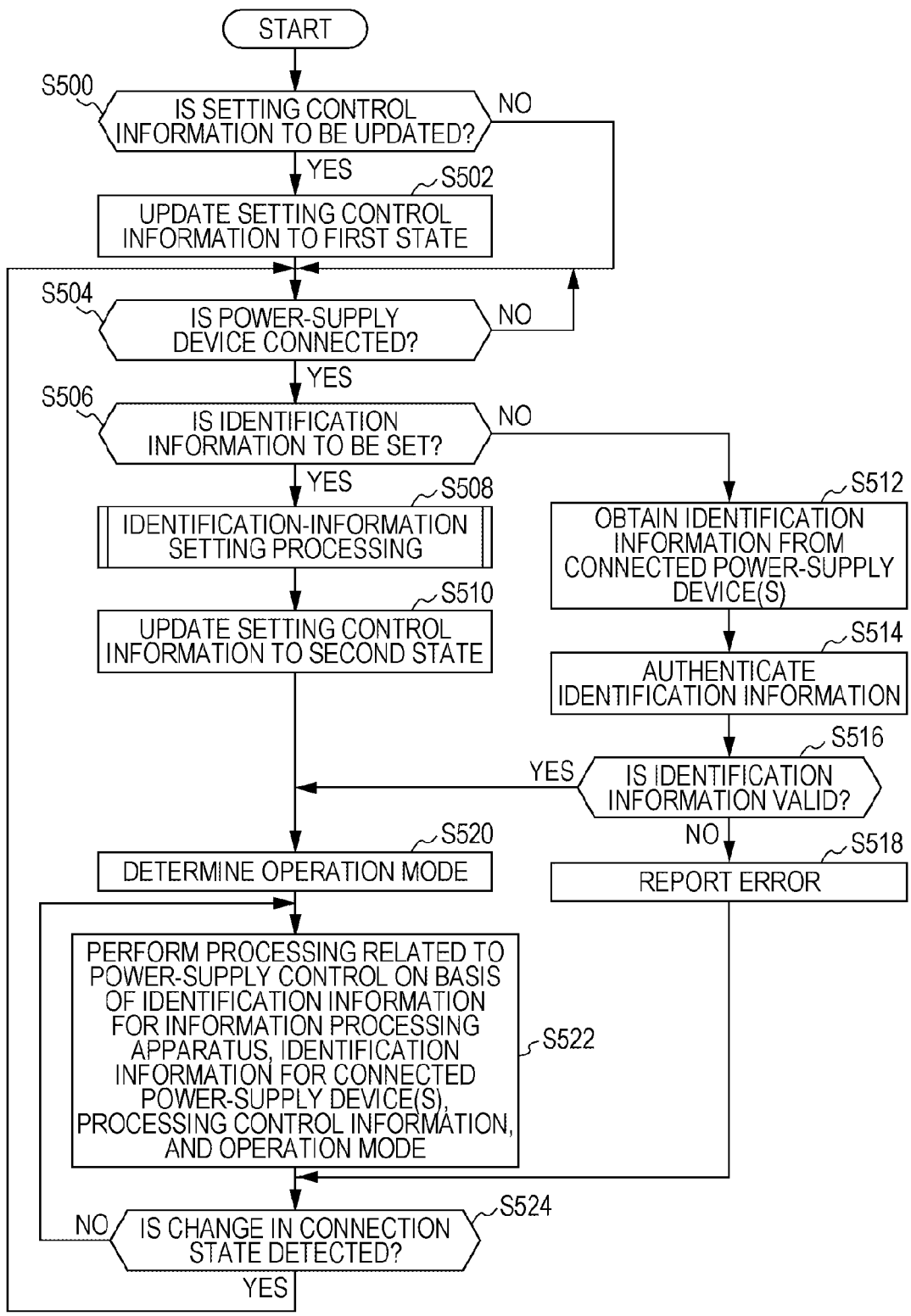
FIG. 7 is a flow diagram showing a second example of the processing according to the power-supply control approach for the information processing apparatus according to the embodiment of the present invention.

The processing according to the power-supply control approach for the information processing apparatus 100 according to the embodiment of the present invention is not limited to the processing in the first example, for example, shown in FIG. 3. FIG. 7 is a flow diagram showing a second example of the processing according to the power-supply control approach for the information processing apparatus 100 according to the embodiment of the present invention.

Processes in steps S504 to S524 shown in FIG. 7 are analogous to the processes in step S100 to S120 shown in FIG. 3. The processing in the second example shown in FIG. 7 is different from the processing in FIG. 3 in that processing in steps S500 and S502 is further provided prior to step S504 corresponding to step S100 shown in FIG. 3. A description of the processing in steps S504 to S524 which is analogous to the processing in the first example shown in FIG. 3 is not given, and the processing in steps S500 and S502 is described below.

In step S500, the information processing apparatus 100 determines whether or not the setting control information is to be updated. In this case, when a password for resetting is input by a user operation using an operation section described below and the password matches a stored password, the information processing apparatus 100 determines that the setting control information is to be updated. The information processing apparatus 100 may pre-store the password at the time of factory shipment or the like or may store the password set as appropriate based on a user operation.

The determination in the processing in step S500, the processing being performed by the information processing apparatus 100 according to the embodiment of the present invention, is not limited to the above-described processing using the password. For example, the information processing apparatus 100 can also make the determination in the processing in step S500, for example, on the basis of whether or not a reset switch, the use of which is physically restricted by locking with a key, or the like is pressed.

When it is determined in step S500 that the setting control information is not to be updated, the information processing apparatus 100 performs processing in step S504 and the subsequent steps.

When it is determined in step S500 that the setting control information is to be updated, the process proceeds to step S502 in which the information processing apparatus 100 updates the setting control information to the first state. The information processing apparatus 100 then performs processing in step S504 and the subsequent steps.

For example, when the user purchases a new battery (which is one example of the first power-supply device 200), he or she may desire to make the battery usable for the information processing apparatus 100. Such a desire can be satisfied, since the information processing apparatus 100 makes the identification information for the power-supply device resettable in the processing in step S502.

For example, by performing the processing shown in FIG. 7, the information processing apparatus 100 can satisfy the above-described desire of the user and thus can further enhance usability.

Since the processing shown in FIG. 7 includes the processing that is similar to the processing in the first example shown in FIG. 3, the information processing apparatus 100 can realize the above-described power-supply control approach through use of the processing shown in FIG. 7, as in the case using the processing in the first example shown in FIG. 3.

Thus, for example, through the processing shown in FIG. 7, the information processing apparatus 100 restricts use of an unauthorized power-supply device and an unauthorized information processing apparatus while improving usability. This makes it possible to inhibit fraudulent obtainment of the power-supply devices and the information processing apparatus by a third party.

The information processing apparatus 100 can realize the above-described power-supply control approach by performing, for example, the processing in the first example shown in FIG. 3 and/or the processing in the second example shown in FIG. 7. Needless to say, the processing according to the power-supply control approach for the information processing apparatus 100 according to the embodiment of the present invention is not limited to the processing shown in FIGS. 3 and 7.

(Power-Supply Control System According to Embodiment of Present Invention)

An example of the configuration of the power-supply control system 1000, the configuration being capable of realizing the above-described power-supply control approach according to the embodiment of the present invention, will be described next. The following description is given in conjunction primarily with an example in which the power-supply control system 1000 according to the embodiment of the present invention has a configuration in which, as shown in FIG. 1, two power-supply devices, i.e., the first power-supply device 200 and the second power-supply device 300, can be connected to the information processing apparatus 100.

[Information Processing Apparatus 100]

Figure 8:
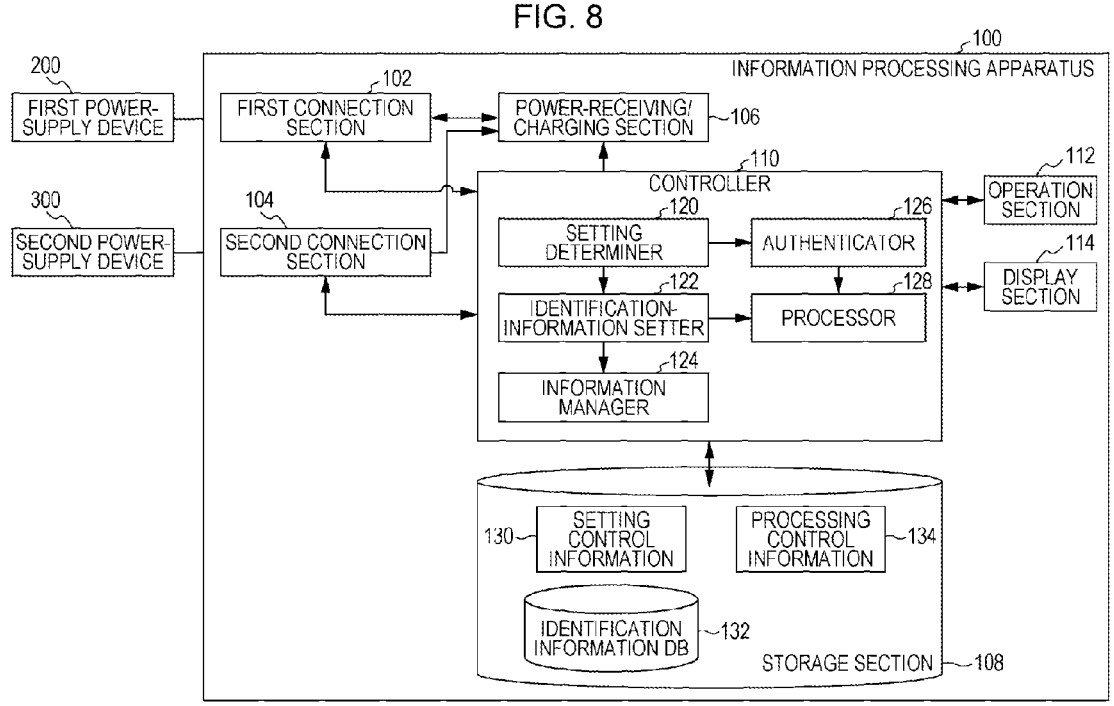
FIG. 8 is a block diagram showing one example of the configuration of the information processing apparatus according to the embodiment of the present invention.

FIG. 8 is a block diagram showing one example of the configuration of the information processing apparatus 100 according to the embodiment of the present invention. FIG. 8 shows a case in which the first power-supply device 200 and the second power-supply device 300 are connected to the information processing apparatus 100. A description will now be given in conjunction with an example of the case in which the first power-supply device 200 and the second power-supply device 300 are connected to the information processing apparatus 100.

The information processing apparatus 100 includes a first connection section 102, a second connection section 104, a power-receiving/charging section 106, a storage section 108, a controller 110, an operation section 112, and a display section 114.

The information processing apparatus 100 may include, for example, a ROM (Read Only Memory, not shown), a RAM (Random Access Memory, not shown), and an image capture section (not shown) for capturing an image. The information processing apparatus 100 includes a bus that serves as a data transmission path to provide connections between the elements.

The ROM (not shown) stores control data, such as programs and computation parameters, used by the controller 110. The RAM (not shown) temporarily stores, for example, programs executed by the controller 110.

[Example of Hardware Configuration of Information Processing Apparatus 100]

Figure 9:
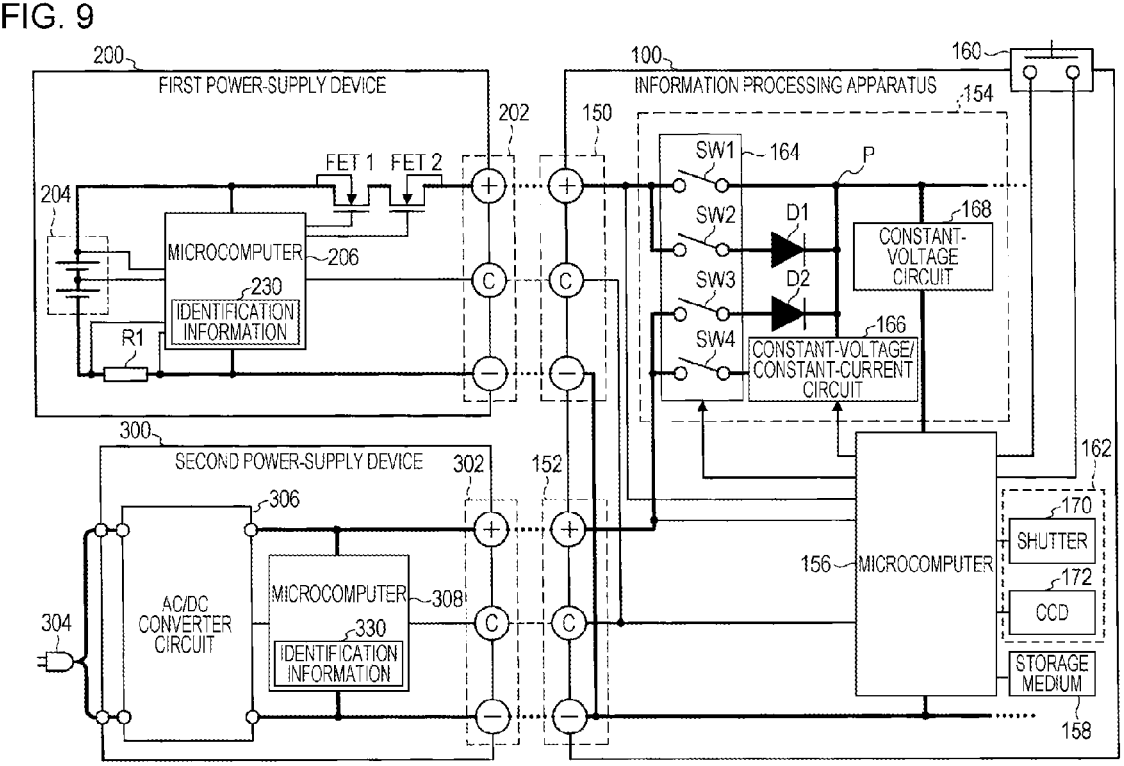
FIG. 9 illustrates one example of the hardware configuration of the information processing apparatus according to the embodiment of the present invention.

FIG. 9 illustrates one example of the hardware configuration of the information processing apparatus 100 according to the embodiment of the present invention. The example of the hardware configuration shown in FIG. 9 corresponds to a case in which the information processing apparatus 100 is a digital camera, for example, as shown in FIG. 1.

FIG. 9 also illustrates examples of the hardware configurations of the first power-supply device 200 and the second power-supply device 300 shown in FIG. 8. In the example of the hardware configurations shown in FIG. 9, the first power-supply device 200 is a secondary battery and the second power-supply device 300 is an AC adapter. Examples of the hardware configurations of the first power-supply device 200 and the second power-supply device 300 are described below.

The hardware configurations of the information processing apparatus 100, the first power-supply device 200, and the second power-supply device 300 will now be described below with reference to drawings, in which symbol "+" indicates a positive power-supply terminal (hereinafter may be referred to as a "positive terminal"), symbol "−" indicates a negative power-supply terminal (hereinafter may be referred to as a "negative terminal"), and character "C" indicates a communication terminal.

The information processing apparatus 100 includes a first connection circuit 150, a second connection circuit 152, a power-receiving/charging section 154, a microcomputer 156, a storage medium 158, a shutter release button 160, and an image-capture mechanism 162.

The first connection circuit 150 functions as the first connection section 102 to which the first power-supply device 200 is connected. The first connection circuit 150 has a positive terminal and a negative terminal for power feeding from the first power-supply device 200 and charging the first power-supply device 200. The first connection circuit 150 has a communication terminal for communicating with the first power-supply device 200 (strictly speaking, a microcomputer 206 described below). Although not shown in FIG. 9, the first connection section 102 may have a power-supply slot for accommodating the first power-supply device 200, a mechanism (e.g., a mechanical switch) for detecting a connection of the first power-supply device 200, and so on.

The second connection circuit 152 functions as the second connection section 104 to which the second power-supply device 300 is connected. The second connection circuit 152 has a positive terminal and a negative terminal for power feeding from the second power-supply device 300 and a communication terminal for communicating with the second power-supply device 300 (strictly speaking, a microcomputer 308 described below). Although not shown in FIG. 9, the second connection section 104 may have a mechanism (e.g., a mechanical switch) for detecting a connection of the second power-supply device 300 and so on.

The power-receiving/charging section 154 functions as the power-receiving/charging section 106 and serves to receive power fed from the first power-supply device 200 and/or the second power-supply device 300 and to charge the first power-supply device 200. The power-receiving/charging section 154 has a switch circuit 164, diodes D1 and D2, a constant-voltage/constant-current circuit 166, and a constant-voltage circuit 168. The switch circuit 164 includes switches SW1 to SW4.

One terminal of each of the switches SW1 to SW4 included in the switch circuit 164 is connected to either the positive terminal of the first connection circuit 150 or the positive terminal of the second connection circuit 152. Another terminal of each of the switches SW1 to SW3 included in the switch circuit 164 is connected to a node P, which acts as an unregulated power supply, via the diode D1 or D2 or directly. Another terminal of the switch SW4 included in the switch circuit 164 is connected to the node P, which acts as the unregulated power supply, via the constant-voltage/constant-current circuit 166.

Under the control of the microcomputer 156, each of the switches SW1 to SW4 included in the switch circuit 164 is selectively turned on/off according to power reception and charge. Examples of the control performed by the microcomputer 156 include turning off the switch SW1 and turning on the switch SW2 during reception of power from the first power-supply device 200 and turning on the switch SW1 and turning off the switch SW2 during charging of the first power-supply device 200. The reception of power from the second power-supply device 300 is realized by the microcomputer 156 controlling the on/off of the switches SW3 and SW4.

For example, through control of the switches SW1 to SW4 included in the switch circuit 164, the information processing apparatus 100 can selectively restrict power-supply-related processing using the connected power-supply devices.

Each of the switches SW1 and SW4 is implemented by, for example, a p-channel MOSFET (Metal Oxide Semiconductor Field Effect Transistor) or an n-channel MOSFET, but is not limited thereto.

In accordance with an output control signal transmitted from the microcomputer 156, the constant-voltage/constant-current circuit 166 performs output at a constant voltage or a constant current on the basis of an input received from the switch SW4.

The constant-voltage circuit 168 supplies power, obtained by transforming the unregulated voltage into a constant voltage, to the microcomputer 156.

With the configuration shown in FIG. 9, the power-receiving/charging section 154 can receive power fed from the first power-supply device 200 and/or the second power-supply device 300 and can charge the first power-supply device 200.

The microcomputer 156 is implemented by, for example, a CPU (central processing unit) or an IC (integrated circuit), into which multiple circuits are integrated, for realizing a control function. The microcomputer 156 functions as the controller 110 for controlling the entire information processing apparatus 100. The microcomputer 156 can also serve as a setting determiner 120, an identification-information setter 122, an information manager 124, an authenticator 126, and a processor 128 (which are described below) in the information processing apparatus 100.

Figure 10:
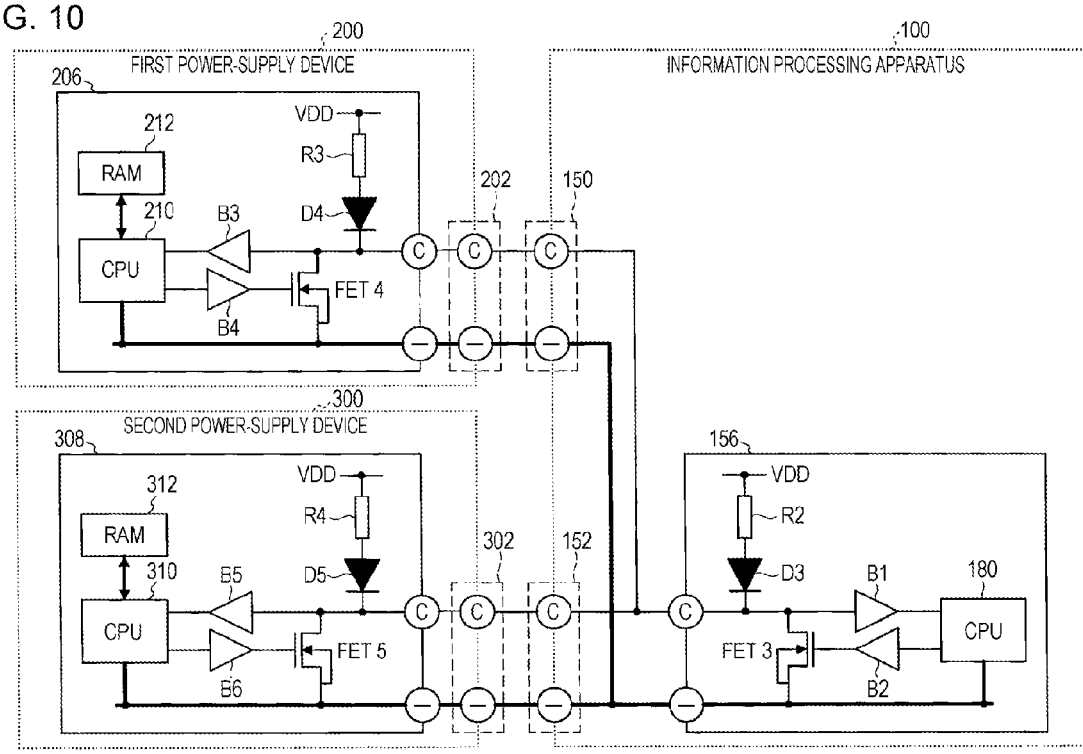
FIG. 10 illustrates one example of the hardware configuration of a microcomputer included in the information processing apparatus according to the embodiment of the present invention.

FIG. 10 illustrates one example of the hardware configuration of the microcomputer 156 included in the information processing apparatus 100 according to the embodiment of the present invention. More specifically, FIG. 10 shows, of the configuration of the microcomputer 156, elements related to communication with the microcomputer 206 in the first power-supply device 200 and the microcomputer 308 in the second power-supply device 300.

FIG. 10 also illustrates one example of the hardware configuration of the microcomputer 206 included in the first power-supply device 200 and one example of the hardware configuration of the microcomputer 308 included in the second power-supply device 300. FIG. 10 shows, of the configurations of the microcomputer 206 and the microcomputer 308, elements related to communication with the information processing apparatus 100. The configurations of the microcomputer 206 and the microcomputer 308 are described below.

A communication terminal of the microcomputer 156 is connected to the communication terminal of the first connection circuit 150 and the communication terminal of the second connection circuit 152. The microcomputer 156 communicates with the first power-supply device 200 and the second power-supply device 300 by selectively switching between the signal levels (high and low levels) of a signal output from the communication terminal of the microcomputer 156. A negative terminal of the microcomputer 156 is connected to the negative terminal of the first connection circuit 150 and the negative terminal of the second connection circuit 152.

The communication terminal of the microcomputer 156 is an open drain terminal and is pulled up by a reference voltage VDD via a resistor R2 and a diode D3. The communication terminal of the microcomputer 156 is connected to a drain terminal of a field effect terminal (FET) 3 and is also connected to a CPU 180 via an input buffer B1.

The CPU 180 plays a leading role of performing, in the controller 110, processing related to control of the entire information processing apparatus 100 and processing related to power-supply control according to the embodiment of the present invention. For communication with the connected first power-supply device 200 and the connected second power-supply device 300, the CPU 180 selectively turns on/off the FET 3 by applying a control signal to a gate terminal of the FET 3 via an output buffer B2.

More specifically, for putting the level of a signal to be output from the communication terminal of the microcomputer 156 into a high level, the CPU 180 applies a low-level control signal to the gate terminal of the FET 3 via the output buffer B2. Consequently, the FET 3 is turned off, so that a high-level signal is output from the communication terminal of the microcomputer 156 as a result of pulling by the reference voltage VDD via the resistor R2 and the diode D3.

For putting the level of a signal to be output from the communication terminal of the microcomputer 156 into a low level, the CPU 180 applies a high-level control signal to the gate terminal of the FET 3 via the output buffer B2. Consequently, the FET 3 is turned on, so that a low-level signal is output from the communication terminal of the microcomputer 156 as a result of pulling to the FET 3.

For example, with the configuration shown in FIG. 10, the microcomputer 156 can communicate with the connected first power-supply device 200 and second power-supply device 300 by selectively switching between the signal levels at the communication terminal. Since the CPU 180 is included, the microcomputer 156 can play a leading role of performing processing related to control of the entire information processing apparatus 100 and processing related to power-supply control according to the embodiment of the present invention.

The configuration for communication of the microcomputer 156 included in the information processing apparatus 100 according to the embodiment of the present invention is not limited to the configuration shown in FIG. 10. For example, the microcomputer 156 may further include an encryption circuit and a decryption circuit for performing encrypted communication with the first power-supply device 200 and the second power-supply device 300. In this case, the information processing apparatus 100, the first power-supply device 200, and the second power-supply device 300 can perform encrypted communication with each other according to various encrypted systems, such as a public-key system and a common-key system, but are not limited thereto.

Through the encrypted communication, the information processing apparatus 100 can obtain the identification information from each of the first power-supply device 200 and the second power-supply device 300, thus making it possible to prevent identification-information false recognition due to communication noise and so on in the information processing apparatus 100. Thus, even if communication noise occurs for some reason when the information processing apparatus 100, the first power-supply device 200, and the second power-supply device 300 perform encrypted communication with each other, it is possible to more reliably perform power-supply control according to the embodiment of the present invention.

One example of the hardware configuration of the information processing apparatus 100 will now be described with reference back to FIG. 9. The storage medium 158 functions as the storage section 108 to store, for example, various types of data, such as the setting control information, the generated identification information, the processing control information, and applications.

The storage medium 158 is, but is not limited to, a nonvolatile memory, such as a magnetic storage medium (e.g., a hard disk), an EEPROM (Electrically Erasable and Programmable Read Only Memory), a flash memory, an MRAM (Magnetoresistive Random Access Memory), an FeRAM (Ferroelectric Random Access Memory), or a PRAM (Phase change Random Access Memory). The storage medium 158 in the information processing apparatus 100 may also be a storage medium that is removably attached to the information processing apparatus 100.

The shutter release button 160 functions as the operation section 112 in the information processing apparatus 100 and is operable by the user. When the shutter release button 160 is pressed, an operation signal indicating that it is pressed is transmitted to the microcomputer 156. On the basis of the operation signal, the microcomputer 156 controls the image-capture mechanism 162 to cause it to selectively capture an image.

The operation section 112 in the embodiment of the present invention is not limited to the shutter release button 160 shown in FIG. 9. For example, operation input devices, such as buttons, a direction key, a rotary selector such as a jog dial, or a combination thereof, for the information processing apparatus 100 can be used to function as the operation section 112. Needless to say, other operation input devices (e.g., a keyboard and a mouse) that are external devices of the information processing apparatus 100 can also serve as the operation section 112 in the embodiment of the present invention.

The image-capture mechanism 162 functions as an image capture section (not shown) for performing image capture, which is controlled by the microcomputer 156. Although FIG. 9 shows an example in which the image-capture mechanism 162 is constituted by a shutter 170 and a CCD (charge coupled device), the configuration is not limited thereto.

For example, with the configuration shown in FIG. 9, the information processing apparatus 100 can perform processing according to the power-supply control approach.

Figure 11:
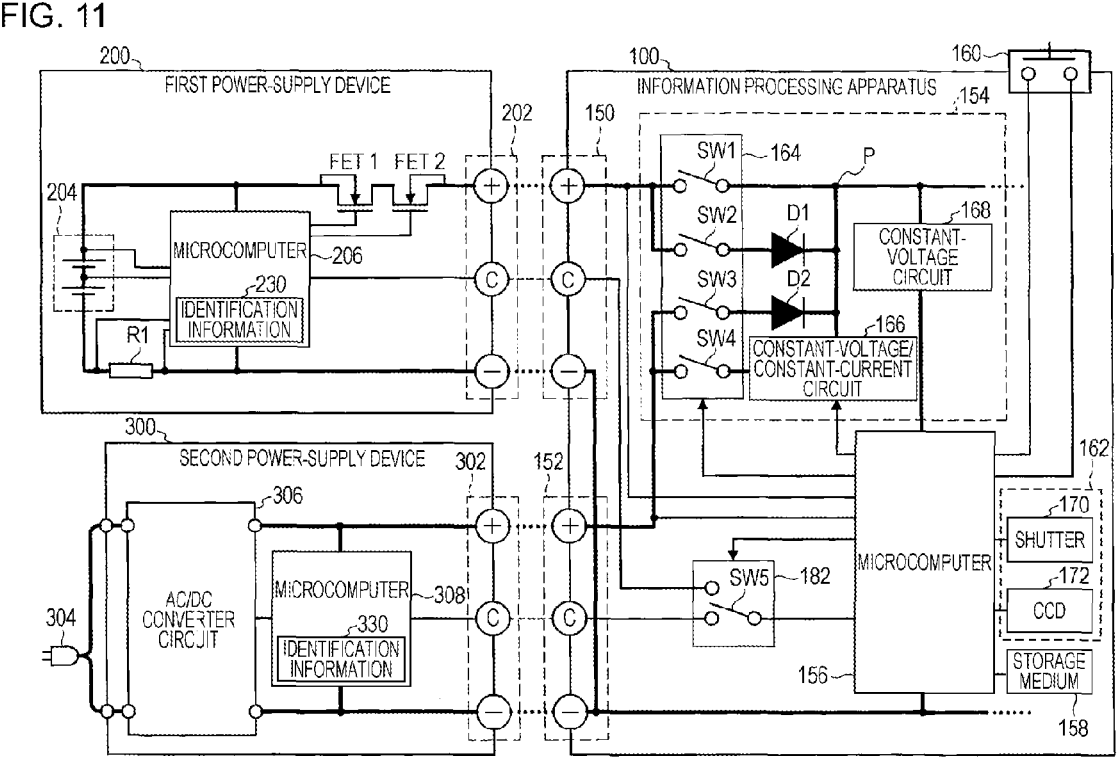
FIG. 11 illustrates another example of the hardware configuration of the information processing apparatus according to the embodiment of the present invention.

The hardware configuration of the information processing apparatus 100 according to the embodiment of the present invention is not limited to the configuration shown in FIG. 9. FIG. 11 illustrates another example of the hardware configuration of the information processing apparatus 100 according to the embodiment of the present invention. Similarly to FIG. 9, the example of the hardware configuration shown in FIG. 11 corresponds to a case in which the information processing apparatus 100 is a digital camera, for example, as shown in FIG. 1. Similarly to FIG. 9, FIG. 11 also shows examples of the hardware configurations of the first power-supply device 200 and the second power-supply device 300 shown in FIG. 8.

A difference between the configuration of the information processing apparatus 100 shown in FIG. 9 and the configuration of the information processing apparatus 100 shown in FIG. 11 is that the configuration shown in FIG. 11 further includes a switching circuit 182 having a switch SW5. The information processing apparatus 100 shown in FIG. 11 is also different from the information processing apparatus 100 shown in FIG. 9 in that the microcomputer 156 controls the switch SW5 to selectively switch between communication with the first power-supply device 200 and communication with the second power-supply device 300. With the configuration shown in FIG. 11, the information processing apparatus 100 can also communicate with the first power-supply device 200 and the second power-supply device 300.

As described above, the configuration of the information processing apparatus 100 shown in FIG. 11 is the same as the configuration shown in FIG. 9 except that the information processing apparatus 100 shown in FIG. 11 has the switching circuit 182. Thus, the information processing apparatus 100 having the configuration shown in FIG. 11 can perform processing according to the power-supply control approach, as in the case of the configuration shown in FIG. 9.

The hardware configuration of the information processing apparatus 100 according to the embodiment of the present invention is not limited to the configurations shown in FIGS. 9 and 11. For example, the information processing apparatus 100 may have a display device (not shown) functioning as the display section 114 and a communication interface (not shown) for communicating with an external device.

Examples of the display device (not shown) in the embodiment of the present invention include, but are not limited to, an LCD (liquid crystal display), an organic EL (electroluminescence) display, and an OLED (organic light emitting diode) display. A display device (e.g., an external display) that is an external device of the information processing apparatus 100 can also be used to serve as the display section 114 in the embodiment of the present invention.

Examples of the communication interface (not shown) in the embodiment of the present invention include, but are not limited to, a communication antenna and an RF circuit (wireless communication), an IEEE 802.15.1 port and a transmission/reception circuit (wireless communication), an IEEE 802.11b port and a transmission/reception circuit (wireless communication), and a LAN (local area network) terminal and a transmission/reception circuit (wired communication).

One example of the configuration of the information processing apparatus 100 will now be described with reference back to FIG. 8. As described above, the first power-supply device 200 is connected to the first connection section 102. Through the use of the first connection circuit 150 shown in, for example, FIG. 9, the first connection section 102 receives power from the first power-supply device 200, charges the first power-supply device 200, and communicates with the first power-supply device 200.

As described above, the second power-supply device 300 is connected to the second connection section 104. Through the use of the second connection circuit 152 shown in, for example, FIG. 9, the second connection section 104 receives power from the second power-supply device 300 and communicates with the second power-supply device 300.

The power-receiving/charging section 106 serves to selectively receive power fed from the first power-supply device 200 and/or the second power-supply device 300 and charge the first power-supply device 200. The power reception and/or the charge of the power-receiving/charging section 106 is controlled by the controller 110. In this case, the power-receiving/charging section 106 is implemented by, for example, the power-receiving/charging section 154 shown in FIG. 9, but is not limited thereto.

The storage section 108 serves as storing means included in the information processing apparatus 100. Examples of the storage section 108 include, but are not limited to, a magnetic storage medium, such as a hard disk, and a nonvolatile memory, such as a flash memory.

The storage section 108 stores, for example, various types of data, such as the setting control information, the generated identification information, the processing control information, and applications. FIG. 8 illustrates an example in which the storage section 108 stores, but is not limited thereto, setting control information 130, an identification information database (DB) 132 containing setting information generated in a database format, and processing control information 134.

The controller 110 is implemented by, for example, a CPU or an IC into which various processing circuits are integrated and serves to control the entire information processing apparatus 100. As described above, the controller 110 includes the setting determiner 120, the identification-information setter 122, the information manager 124, the authenticator 126, and the processor 128, and plays a leading role of performing the processing according to the above-described control approach.

The setting determiner 120 determines whether or not identification information is to be set, on the basis of the connection state of the first connection section 102, the connection state of the second connection section 104, and the setting control information. More specifically, the setting determiner 120 serves to perform, for example, the processing in steps S100 and S102 shown in FIG. 3.

The setting determiner 120 transmits results of the determinations to the identification-information setter 122 and the authenticator 126. Upon determining that identification information is to be set, the setting determiner 120 may selectively transmit the result of the determination to the identification-information setter 122, and upon determining that no identification information is to be set, the setting determiner 120 may selectively transmit the result of the determination to the authenticator 126.

On the basis of the determination result that is transmitted from the setting determiner 120 and that indicates that identification information is to be set, the identification-information setter 122 generates identification information for the power-supply device(s) connected to the connection section(s) and identification information for the information processing apparatus 100 in association with each other. The identification-information setter 122 then causes the generated identification information to be set for the power-supply device(s) connected to the connection section(s). More specifically, the identification-information setter 122 serves to perform, for example, the processing in step S104 shown in FIG. 3 (more specifically, for example, the processing shown in FIGS. 4 to 6).

Upon completion of the setting of the identification information for the power-supply device(s) connected to the connection section(s), the identification-information setter 122 transmits, to the information manager 124 and the processor 128, a processing result indicating that the processing is completed.

The information manager 124 manages information regarding the processing according to the power-supply control approach. The information includes, for example, the setting control information and the identification information.

More specifically, the information manager 124 records, for example, in the identification information DB 132 in the storage section 108, the identification information (the third identification information) that is generated by the identification-information setter 122 and that corresponds to the information processing apparatus 100 (this recording processing corresponds to, for example, the processing in S210 in FIG. 4).

On the basis of the processing result transmitted from the identification-information setter 122, the information manager 124 updates the processing control information 134 stored in, for example, the storage section 108 to the second state (this update corresponds to, for example, the processing in step S106 shown in FIG. 3).

On the basis of an operation signal that corresponds to a user operation and that is transmitted from the operation section 112, the information manager 124 updates the processing control information 134 stored in, for example, the storage section 108 to the second state (this update corresponds to, for example, the processing in steps S500 and S502 shown in FIG. 7). In this case, the information manager 124 transmits, to the setting determiner 120, a processing result indicating that the processing control information 134 has been updated (this transmission is not illustrated). Upon receiving the processing result from the information manager 124, the setting determiner 120 determines whether or not identification information is to be set (this determination corresponds to, for example, the processing in step S504 shown in FIG. 7).

The information regarding the processing according to the power-supply control approach, the information being manageable by the information manager 124, is not limited to the information stored in the storage section 108. For example, when the information regarding the processing according to the power-supply control approach is stored in an external apparatus such as a server, the information manager 124 can also manage the information stored in the external apparatus. In this case, for use of the information regarding the processing according to the power-supply control approach, the elements in the controller 110 obtain the information from the external apparatus, as appropriate.

On the basis of a determination result that is transmitted from the setting determiner 120 and that indicates that no identification information is to be set, the authenticator 126 obtains identification information from the connected power-supply device(s) (this processing corresponds to the processing in step S108 shown in FIG. 3). On the basis of the obtained identification information and the stored identification information (e.g., the identification information DB 132 stored in the storage section 108), the authenticator 126 authenticates the obtained identification information (e.g., the authentication corresponds to the processing in steps S110 and S112 shown in FIG. 3).

The authenticator 126 transmits a result of the authentication to the processor 128.

The processor 128 selectively performs executable power-supply-related processing, on the basis of the processing result transmitted from the identification-information setter 122 or the authentication result transmitted from the authenticator 126 and of the processing control information 134. The processor 128 can also determine an operation mode of the information processing apparatus 100 and can further switch the power-supply control in accordance with the determined operation mode.

The processor 128 also reports an error, for example, when an authentication result indicating that a power-supply device having invalid identification information is connected is received from the authenticator 126.

Since the controller 110 includes, for example, the setting determiner 120, the identification-information setter 122, the information manager 124, the authenticator 126, and the processor 128, the controller 110 can play a leading role of performing the processing according to the above-described power-supply control approach.

The operation section 112 serves as operating means included in the information processing apparatus 100 and allows a user to perform an operation. Since the information processing apparatus 100 has the operation section 112, it allows user operation and can perform user-desired processing in accordance with the user operation. Examples of the operation section 112 include, but are not limited to, buttons, a direction key, a rotary selector such as a jog dial, and a combination thereof.

The display section 114 serves as displaying means included in the information processing apparatus 100 and displays various types of information on a display screen. Examples of a view displayed on the display screen of the display section 114 include, but are not limited to, an error-reporting view and other operation views for causing the information processing apparatus 100 to perform desired operations. Examples of the display section 114 include, but are not limited to, an LCD and an organic EL display. For example, the display section 114 of the information processing apparatus 100 may be implemented by a touch screen. In this case, the display section 114 functions as an operation display section that enables both display and user operation.

For example, with the configuration shown in FIG. 8, the information processing apparatus 100 can realize the processing according to the power-supply control approach. Thus, for example, with the configuration shown in FIG. 8, the information processing apparatus 100 restricts use of an unauthorized power-supply device and an unauthorized information processing apparatus. This makes it possible to inhibit fraudulent obtainment of the power-supply devices and the information processing apparatus by a third party.

The configuration of the information processing apparatus according to the embodiment of the present invention is not limited to the configuration shown in FIG. 8. For example, the information processing apparatus 100 according to the embodiment of the present invention may also have a configuration in which it lacks the storage section 108 and has a communication section (not shown) for communicating with an external device that can store the information (such as the setting control information and the identification information) regarding the processing according to the power-supply control approach.

In the case of the configuration described above, for example, the information manager 124 in the information processing apparatus 100 according to the embodiment of the present invention manages the information (stored in the external device) regarding the processing according to the power-supply control approach via a communication section (not shown). When any of the elements in the controller 110 in the information processing apparatus according to the embodiment of the present invention is to use the information regarding the processing according to the power-supply control approach, the element in the controller 110 obtains the information from the external device, as appropriate. Even with such a configuration, the information processing apparatus according to the embodiment of the present invention can realize the processing according to the power-supply control approach according to the embodiment of the present invention. Thus, it is possible to inhibit fraudulent obtainment of the power-supply devices and the information processing apparatus by a third part, by restricting use of an unauthorized power-supply device and an unauthorized information processing apparatus.

[First Power-Supply Device 200]

The first power-supply device 200 will be described next. As described above, the first power-supply device 200 stores the identification information. When the first power-supply device 200 has power-feeding and charging capabilities and is connected to the information processing apparatus 100, the first power-supply device 200 supplies power to the information processing apparatus 100 or is charged with charging current supplied from the information processing apparatus 100 in accordance with the power-supply control performed by the information processing apparatus 100. When the first power-supply device 200 has a power-feeding capability and is connected to the information processing apparatus 100, the first power-supply device 200 supplies power to the information processing apparatus 100 in accordance with the power-supply control performed by the information processing apparatus 100.

[Example of Hardware Configuration of First Power-Supply Device 200]

An example of the hardware configuration of the first power-supply device 200 will now be described in conjunction with an example in which the first power-supply device 200 is a secondary battery that has power-feeding and charging capabilities. Referring to FIG. 9, the first power-supply device 200 includes a connection circuit 202, a cell 204, a microcomputer 206, a resistor R1 for current detection, an FET 1 for charge protection, and an FET 2 for discharge protection.

The connection circuit 202 functions as the connection section of the first power-supply device 200. The information processing apparatus 100 is connected to the connection circuit 202. The connection circuit 202 has a positive terminal and a negative terminal for feeding power to the information processing apparatus 100 and for charging with power from the information processing apparatus 100. The connection circuit 202 has a communication terminal for communication with the information processing apparatus 100 (strictly speaking, the microcomputer 156).

The cell 204 serves as a power source in the first power-supply device 200. Although FIG. 9 illustrates an example in which the cell 204 is constituted by two cells, the number of cells is not limited thereto. A positive electrode of the cell 204 is connected to the positive terminal of the connection circuit 202 via the FETs 1 and 2. A negative electrode of the cell 204 is connected to the negative terminal of the connection circuit 202 via the resistor R1.

The microcomputer 206 is implemented by, for example, a CPU or an IC, into which multiple circuits are integrated, for realizing a control function. The microcomputer 206 functions as a controller for controlling the entire first power-supply device 200. The microcomputer 206 stores identification information 230. Examples of the control performed by the microcomputer 206 include control for power-feed/charge and control for communication with the information processing apparatus 100.

<Example of Control for Power-Feed/Charge>

The microcomputer 206 has, for example, an AD converter and monitors a total voltage of the cells included in the cell 204 and a medium voltage of the cells included in the cell 204. Upon detecting an irregular voltage in the cell 204, the microcomputer 206 turns off the FET 1 or 2 to perform charge protection or discharge protection, thereby protecting the first power-supply device 200 and the information processing apparatus 100.

The microcomputer 206 measures a voltage across the resistor R1. Upon detecting an irregular voltage as a result of the measurement, the microcomputer 206 turns off the FET 1 or 2 to protect the first power-supply device 200 and the information processing apparatus 100.

The microcomputer 206 manages the cell 204 by estimating a current value on the basis of a difference in potential across the resistor R1 and adding up the estimated current value to determine a total value of current stored in the cell 204.

The microcomputer 206 can perform the power-feed/charge control by performing, for example, processing as described above. Needless to say, the power-feed/charge control performed by the microcomputer 206 included in the first power-supply device 200 according to the embodiment of the present invention is not limited to the above-described example.

<Communication Control>

One example of communication control performed by the microcomputer 206 will now be described with reference to FIG. 10. A communication terminal of the microcomputer 206 is connected to the communication terminal of the connection circuit 202. The microcomputer 206 communicates with the information processing apparatus 100 by selectively switching between the signal levels (the high and low levels) of a signal output from the communication terminal of the microcomputer 206. A negative terminal of the microcomputer 206 is connected to the negative terminal of the connection circuit 202.

The communication terminal of the microcomputer 206 is an open drain terminal and is pulled up by a reference voltage VDD via a resistor R3 and a diode D4. The communication terminal of the microcomputer 206 is connected to a drain terminal of an FET 4 and is connected to a CPU 210 via an input buffer B3.

The CPU 210 plays a leading role of performing processing related to control of the entire first power-supply device 200. For example, for communication with the connected information processing apparatus 100, the CPU 210 selectively turns on/off the FET 4 by applying a control signal to a gate terminal of the FET 4 via an output buffer B4.

More specifically, for putting the level of a signal output from the communication terminal of the microcomputer 206 into a high level, the CPU 210 applies a low-level control signal to the gate terminal of the FET 4 via the output buffer B4. Consequently, the FET 4 is turned off, so that a high-level signal is output from the communication terminal of the microcomputer 206 as a result of pulling by the reference voltage VDD via the resistor R3 and the diode D4.

For putting the level of a signal output from the communication terminal of the microcomputer 206 into a low level, the CPU 210 applies a high-level control signal to the gate terminal of the FET 4 via the output buffer B4. Consequently, the FET 4 is turned on, so that a low-level signal is output from the communication terminal of the microcomputer 206 as a result of pulling to the FET 4.

For example, with the configuration shown in FIG. 10, the microcomputer 206 can communicate with the connected information processing apparatus 100 by selectively switching between the signal levels at the communication terminal. Thus, in response to an identification-information transmission instruction transmitted from the information processing apparatus 100, the microcomputer 206 can transmit the identification information 230, stored in a RAM 212, to the information processing apparatus 100.

The first power-supply device 200 can also store, for example, the power-supply identification information in the RAM 212. In this case, for example, in response to a power-supply identification-information transmission instruction transmitted from the information processing apparatus 100, the first power-supply device 200 can transmit the power-supply identification information, stored in the RAM 212, to the information processing apparatus 100.

For example, according to the configuration shown in FIG. 10, when the identification information in the RAM 212 is updated based on the first identification information and an update instruction transmitted from the information processing apparatus 100, the microcomputer 206 can transmit a result of the update to the information processing apparatus 100.

The configuration for communication of the microcomputer 206 included in the first power-supply device 200 according to the embodiment of the present invention is not limited to the configuration shown in FIG. 10. For example, the microcomputer 206 may further has an encryption circuit and a decryption circuit for performing encrypted communication with the information processing apparatus 100.

For example, with the configuration shown in FIG. 9, upon connection to the information processing apparatus 100, the first power-supply device 200 can supply power to the information processing apparatus 100 or can be charged with charging current supplied from the information processing apparatus 100 in accordance with the power-supply control performed by the information processing apparatus 100. Needless to say, the configuration of the first power-supply device 200 according to the embodiment of the present invention is not limited to the configuration shown in FIG. 9.

[Second Power-Supply Device 300]

The second power-supply device 300 will be described next. As described above, the second power-supply device 300 stores the identification information. Upon connection to the information processing apparatus 100, the second power-supply device 300 supplies power to the information processing apparatus 100 in accordance with the power-supply control performed by the information processing apparatus 100.

[Example of Hardware Configuration of Second Power-Supply Device 300]

An example of the hardware configuration of the second power-supply device 300 will now be described in conjunction with an example in which the second power-supply device 300 is an AC adapter. Referring to FIG. 9, the second power-supply device 300 includes a connection circuit 302, an AC plug 304, an AC/DC (alternating-current/direct-current) converter circuit 306, and a microcomputer 308.

The connection circuit 302 functions as the connection section of the second power-supply device 300. The information processing apparatus 100 is connected to the connection circuit 302. The connection circuit 302 has a positive terminal and a negative terminal for feeding power to the information processing apparatus 100. The connection circuit 302 has a communication terminal for communication with the information processing apparatus 100 (strictly speaking, the microcomputer 156).

The AC plug 304 can be connected to a utility power outlet and can receive an AC voltage (e.g., 120 V). The AC plug 304 is connected to the AC/DC converter circuit 306.

The AC/DC converter circuit 306 converts the AC voltage (e.g., 120 V) into a DC voltage. A positive side of the AC/DC converter circuit 306 is connected to the positive terminal of the connection circuit 302 and a negative side of the AC/DC converter circuit 306 is connected to the negative terminal of the connection circuit 302.

The voltage conversion at the AC/DC converter circuit 306 is controlled by the microcomputer 308. Under the control, the AC/DC converter circuit 306 outputs a DC voltage of, for example, 8.4 V or 4.2 V.

The microcomputer 308 is implemented by, for example, a CPU or an IC, into which multiple circuits are integrated, for realizing a control function. The microcomputer 308 functions as a controller for controlling the entire second power-supply device 300. The microcomputer 308 stores identification information 330. Examples of the control performed by the microcomputer 308 include control for AC-to-DC conversion performed by the AC/DC converter circuit 306 and control for communication with the information processing apparatus 100.

[Example of Conversion Control]

For example, in accordance with an output control instruction transmitted from the information processing apparatus 100, the microcomputer 308 outputs a DC voltage corresponding to the output control instruction to the AC/DC converter circuit 306. The microcomputer 308 also protects the information processing apparatus 100 against overcurrent, for example, by restricting direct current output from the AC/DC converter circuit 306.

The microcomputer 308 performs the conversion control by performing processing as described above. Needless to say, the conversion control performed by the microcomputer 308 included in the second power-supply device 300 according to the embodiment of the present invention is not limited to the above-described example.

<Communication Control>

One example of the communication control performed by the microcomputer 308 will now be described with reference to FIG. 10. A communication terminal of the microcomputer 308 is connected to a communication terminal of the connection circuit 302. The microcomputer 308 communicates with the information processing apparatus 100 by selectively switching between the signal levels (the high and low levels) of a signal output from the communication terminal of the microcomputer 308. A negative terminal of the microcomputer 308 is connected to a negative terminal of the connection circuit 302.

The communication terminal of the microcomputer 308 is an open drain terminal and is pulled up by a reference voltage VDD via a resistor R4 and a diode D5. The communication terminal of the microcomputer 308 is connected to a drain terminal of an FET 5 and is connected to a CPU 310 via an input buffer B5.

The CPU 310 plays a leading role of performing processing related to control of the entire second power-supply device 300. For example, for communication with the connected information processing apparatus 100, the CPU 310 selectively turns on/off the FET 5 by applying a control signal to a gate terminal of the FET 5 via an output buffer B6.

More specifically, for putting the level of a signal output from the communication terminal of the microcomputer 308 into a high level, the CPU 310 applies a low-level control signal to the gate terminal of the FET 5 via the output buffer B6. Consequently, the FET 5 is turned off, so that a high-level signal is output from the communication terminal of the microcomputer 308 as a result of pulling by the reference voltage VDD via the resistor R4 and the diode D5.

For putting the level of a signal output from the communication terminal of the microcomputer 308 into a low level, the CPU 310 applies a high-level control signal to the gate terminal of the FET 5 via the output buffer B6. Consequently, the FET 5 is turned on, so that a low-level signal is output from the communication terminal of the microcomputer 308 as a result of pulling to the FET 5.

For example, with the configuration shown in FIG. 10, the microcomputer 308 can communicate with the connected information processing apparatus 100 by selectively switching between the signal levels at the communication terminal. Thus, in response to an identification-information transmission instruction transmitted from the information processing apparatus 100, the microcomputer 308 can transmit the identification information 330, stored in a RAM 312, to the information processing apparatus 100.

The second power-supply device 300 can also store, for example, the power-supply identification information in the RAM 312. In this case, for example, in response to a power-supply identification-information transmission instruction transmitted from the information processing apparatus 100, the second power-supply device 300 can transmit the power-supply identification information, stored in the RAM 312, to the information processing apparatus 100.

For example, according to the configuration shown in FIG. 10, when the identification information in the RAM 312 is updated based on the second identification information and an update instruction transmitted from the information processing apparatus 100, the microcomputer 308 can transmit a result of the update to the information processing apparatus 100.

The configuration for communication of the microcomputer 308 included in the second power-supply device 300 according to the embodiment of the present invention is not limited to the configuration shown in FIG. 10. For example, the microcomputer 308 may further has an encryption circuit and a decryption circuit for performing encrypted communication with the information processing apparatus 100.

For example, with the configuration shown in FIG. 10, when the second power-supply device 300 is connected to the information processing apparatus 100, the second power-supply device 300 can supply power to the information processing apparatus 100. Needless to say, the configuration of the second power-supply device 300 according to the embodiment of the present invention is not limited to the configuration shown in FIG. 10.

As described above, the power-supply control system 1000 according to the embodiment of the present invention includes the information processing apparatus 100, the first power-supply device 200, and the second power-supply device 300. The information processing apparatus 100 can restrict the executable power-supply-related processing on the basis of the identification information obtained from the connected power-supply device(s), the stored identification information, and the processing control information. The power-supply control system 1000 allows for setting of a restriction for preventing fraudulent use by a malicious third party (i.e., a restriction on execution of the power-supply-related processing). One example of such a restriction is, as shown in FIG. 2, to disable charging of the first power-supply device 200, unless the information processing apparatus 100, the first power-supply device 200, and the second power-supply device 300 which are associated with each other using the identification information become available. That is, according to the power-supply control system 1000, for example, even if a power-supply device stolen by a malicious third party is connected to the information processing apparatus 100, the power-supply-related processing using the stolen power-supply device is restricted. For example, if a malicious third party steals the information processing apparatus 100 and connects an authorized power-supply device thereto, the information processing apparatus 100 can restrict the power-supply-related processing using the power-supply device. Accordingly, since the information processing apparatus 100 is included, the power-supply control system 1000 can inhibit fraudulent obtainment of the power-supply devices and the information processing apparatus by a third parity, by restricting use of an unauthorized power-supply device and an unauthorized information processing apparatus.

For example, during authentication of a connected power-supply device as in the manner shown in FIG. 3, the information processing apparatus 100 automatically performs the authentication without the user having to be aware of the authentication. Thus, since the user does not have to perform any particular operation for the authentication, there is no possibility of causing usability decline. For example, when the information processing apparatus 100 is a digital camera as shown in FIG. 1, the information processing apparatus 100 does not request the user to perform any particular operation for the authentication and thus does not cause user inconvenience (such as missing photo opportunities) resulting from the particular operation.

For example, during setting of the identification information as in the manner shown in FIG. 3, the information processing apparatus 100 automatically sets the identification information without the user having to be aware of the setting. Thus, since the user does not have to perform any particular operation for setting the identification information, there is no possibility of causing usability decline.

Although the information processing apparatus 100 has been described above as an element included in the power-supply control system 1000 according to the embodiment of the present invention, the embodiment of the present invention is not limited to the above-described configuration. The embodiment of the present invention is also applicable to various types of equipment, including computers such as PCs and PDAs (personal digital assistants), image capture devices such as digital cameras, mobile communication devices such as mobile phones and PHS (personal handyphone system) phones, video/music player devices, video/music recorder/player devices, portable game consoles, and transporting apparatuses such as automobiles.

Although the first power-supply device 200 has been described above as an element included in the power-supply control system 1000 according to the embodiment of the present invention, the embodiment of the present invention is not limited to the above-described configuration. The embodiment of the present invention is applicable to various power-supply devices that has a power-feeding capability or power-feeding and charging capabilities. Examples of the power-supply devices include primary batteries and secondary batteries, such as lithium-ion secondary batteries and lithium-ion-polymer secondary batteries.

Although the second power-supply device 300 has been described above as an element included in the power-supply control system 1000 according to the embodiment of the present invention, the embodiment of the present invention is not limited to the above-described configuration. The embodiment of the present invention is applicable to various power-supply devices that have a power-feeding capability. Examples include an AC adapters, solar batteries, fuel batteries, external batteries (e.g., external primary and secondary batteries), and manually operated power generators.

(Program According to Embodiment of Present Invention)

A program for causing a computer to function as the information processing apparatus according to the embodiment of the present invention is provided to restrict use of an unauthorized power-supply device and an unauthorized information processing apparatus, thereby making it possible to inhibit fraudulent obtainment of the power-supply devices and the information processing apparatus by a third party.

Although a preferred embodiment of the present invention has been described above with reference to the accompanying drawings, it goes without saying that the present invention is not limited to the particular embodiment. It is apparent to those skilled in the art that a variety of variations and modifications can be made to the embodiment within the scope of the appended claims, and naturally, it is to be understood that such changes and modifications are also encompassed by the technical scope of the present invention.

For example, although a configuration in which the controller 110 in the information processing apparatus 100 shown in FIG. 8 has the setting determiner 120, the identification-information setter 122, the information manager 124, the authenticator 126, and the processor 128 has been described above, the configuration of the information processing apparatus according to the embodiment of the present invention is not limited thereto. For example, in the information processing apparatus according to the embodiment of the present invention, arbitrary ones of the setting determiner 120, the identification-information setter 122, the information manager 124, the authenticator 126, and the processor 128 shown in FIG. 8 may be independently provided (e.g., may be each realized by an independent processing circuit).

While the program (the computer program) for causing a computer to function as the information processing apparatus according to the embodiment of the present invention has been described above, the present embodiment of the present invention can also provide a storage medium in which the program is stored.

The present application contains subject matter related to that disclosed in Japanese Priority Patent Application JP 2009-252209 filed in the Japan Patent Office on Nov. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a first connection section to which is connected a first power-supply device that has a power-feeding capability or power-feeding and charging capabilities and that is capable of storing unique first identification information;
a second connection section to which is connected a second power-supply device that has a power-feeding capability and that is capable of storing unique second identification information;
a setting determiner to determine whether identification information is to be set for each of the first power-supply device and the second power-supply device at least on a basis of a first state of connection of the first power-supply device to the first connection section, a second state of connection of the second power-supply device to the second connection section, and setting control information specifying whether identification information is to be set for each of the first power-supply device and the second power-supply device;
an authenticator to selectively obtain, when the setting determiner determines that identification information is not to be set, the unique first identification information from the first power-supply device connected to the first connection section and the unique second identification information from the second power-supply device connected to the second connection section and to authenticate the obtained unique first and second identification information;
a storage section for storing at least a third identification information associated with the information processing apparatus;
an identification-information setter to generate, when the setting determiner determines that identification information is to be set, unique first identification information to be set for the first power-supply device connected to the first connection section, unique second identification information to be set for the second power-supply device connected to the second connection section, and unique third identification information indicating the information processing apparatus in association with each other and to cause the unique first identification information and the unique second identification information to be set for the first power-supply device and the second power-supply device, respectively; and
a processor to selectively perform executable power-supply-related processing on at least a basis of a result of the authentication performed by the authenticator or a result of the processing performed by the identification-information setter and of processing control information specifying the executable power-supply-related processing corresponding to a combination of the unique first, second, and third identification information.

2. The information processing apparatus according to claim 1, wherein, when the setting of the unique first identification information for the first power-supply device and the setting of the unique second identification information for the second power-supply device are completed, the identification-information setter notifies a user that identification information is settable for another first power-supply device and another second power-supply device; and
when the other first power-supply device and/or the other second power-supply device is connected to the information processing apparatus, the identification-information setter causes the unique first identification information to be set for the other first power-supply device and/or causes the unique second identification information to be set for the other second power-supply device.

3. The information processing apparatus according to claim 1, wherein, when the setting of the unique first identification information for the first power-supply device and the setting of the unique second identification information for the second power-supply device are completed, the identification-information setter notifies a user that identification information is settable for another first power-supply device and another second power-supply device; and
when the other first power-supply device and/or the other second power-supply device is connected to the information processing apparatus, the identification-information setter generates unique fourth identification information to be set for the other first power-supply device, unique fifth identification information to be set for the other second power-supply device, and unique sixth identification information indicating the information processing apparatus in association with each other and causes the unique fourth identification information and the unique fifth identification information to be set for the other first power-supply device and the other second power-supply device, respectively.

4. The information processing apparatus according to any one of claims 1 to 3, further comprising an information manager to manage the setting control information;
wherein, when the identification information setter causes the identification information to be set, the information manager updates the setting control information to information indicating that identification information is not to be set for the first power-supply device and the second power-supply device; and
in accordance with user operation, the information manager selectively updates the setting control information to information indicating that identification information is to be set for each of the first power-supply device and the second power-supply device.

5. The information processing apparatus according to any one of claims 1 to 3, wherein the processor determines an operation mode of the information processing apparatus, and selectively performs the power-supply-related processing at least on a basis of a result of the determination of the operation mode.

6. A power-supply control method comprising the steps of:
determining whether identification information is to be set for each of a first power-supply device, which has a power-feeding capability or power-feeding and charging capabilities and that is capable of storing unique first identification information, and a second power-supply device, which has a power-feeding capability and that is capable of storing unique second identification information, at least on a basis of a first state of connection of the first power-supply device to a first connection section of an information processing apparatus, a second state of connection of the second power-supply device to a second connection section of the information processing apparatus, and setting control information specifying whether identification information is to be set for each of the first power-supply device and the second power-supply device;

selectively obtaining, when it is determined in the determining step that identification information is not to be set, the unique first identification information from the first power-supply device connected to the first connection section and the unique second identification information from the second power-supply device connected to the second connection section and authenticating the obtained unique first and second identification information;

generating, when it is determined in the determining step that identification information is to be set, unique first identification information to be set for the first power-supply device connected to the first connection section, unique second identification information to be set for the second power-supply device connected to the second connection section, and unique third identification information indicating the information processing apparatus in association with each other;

causing the unique first identification information and the unique second identification information to be set for the first power-supply device and the second power-supply device, respectively; and selectively performing executable power-supply-related processing at least on a basis of a result of the authentication performed in the identification-information obtaining and authenticating step or a result of the processing performed by the identification-information generating and setting step and of processing control information specifying the executable power-supply-related processing corresponding to a combination of the unique first, second, and third identification information.

7. A non-transitory data storage device including machine readable instructions that, when executed by a processor of an information processing apparatus, cause the processor to execute the steps of:

determining whether identification information is to be set for each of a first power-supply device, which has a power-feeding capability or power-feeding and charging capabilities and that is capable of storing unique first identification information, and a second power-supply device, which has a power-feeding capability and that is capable of storing unique second identification information, at least on a basis of a first state of connection of the first power-supply device to a first connection section of the information processing apparatus, a second state of connection of the second power-supply device to a second connection section of the information processing apparatus, and setting control information specifying whether identification information is to be set for each of the first power-supply device and the second power-supply device;

selectively obtaining, when it is determined in the determining step that identification information is not to be set, the unique first identification information from the first power-supply device connected to the first connection section and the unique second identification information from the second power-supply device connected to the second connection section and authenticating the obtained identification information;

generating, when it is determined in the determining step that identification information is to be set, unique first identification information to be set for the first power-supply device connected to the first connection section, unique second identification information to be set for the second power-supply device connected to the second connection section, and unique third identification information indicating the information processing apparatus in association with each other; causing the unique first identification information and the unique second identification information to be set for the first power-supply device and the second power-supply device, respectively; and selectively performing executable power-supply-related processing at least on a basis of a result of the authentication performed in the identification-information obtaining and authenticating step or a result of the processing performed by the identification-information generating and setting step and of processing control information specifying the executable power-supply-related processing corresponding to a combination of the unique first, second, and third identification information.

8. A power-supply control system comprising:

a first power-supply device that has a power-feeding capability or power-feeding and charging capabilities and that is capable of storing unique first identification information;

a second power-supply device that has a power-feeding capability and that is capable of storing unique second identification information; and an information processing apparatus to which the first power-supply device and/or the second power-supply device is connected, the information processing apparatus configured to control power-supply-related processing for the connected first power-supply device and/or the second power-supply device;

wherein the information processing apparatus includes:
a first connection section to which the first power-supply device is connected,
a second connection section to which the second power-supply device is connected,
a setting determiner to determine whether identification information is to be set for each of the first power-supply device and the second power-supply device at least on a basis of a first state of connection of the first power-supply device to the first connection section, a second state of connection of the second power-supply device to the second connection section, and setting control information specifying whether identification information is to be set for each of the first power-supply device and the second power-supply device,
an authenticator to selectively obtain, when the setting determiner determines that identification information is not to be set, the unique first identification information from the first power-supply device connected to the first connection section and the unique second identification information from the second power-supply device connected to the second connection section and to authenticate the obtained unique first and second identification information, a storage section for storing at least a third identification information associated with the information processing apparatus, an identification-information setter to generate, when the setting determiner determines that identification information is to be set, unique first identification information to be set for the first power-supply device connected to the first connection section, unique second identification information to be set for the second power-supply device connected to the second connection section, and unique third identification information indicating the information processing apparatus in association with each other and to cause the unique first identification information and the unique second identification information to be set for the first power-supply device and the second power-supply device, respectively, and a processor to selectively perform executable power-supply-related processing at least on a basis of a result of the authentication performed by the authenticator or a result of the processing performed by the identification-information setter and of processing control information specifying the executable power-supply-related processing corresponding to a combination of the unique first, second, and third identification information.

* * * * *